United States Patent
Milkov et al.

(10) Patent No.: US 7,486,313 B2
(45) Date of Patent: Feb. 3, 2009

(54) SYSTEM AND METHOD FOR AUTOMATIC EXPOSURE CONTROL AND WHITE BALANCING FOR CMOS SENSORS

(75) Inventors: Mihail M. Milkov, Thousand Oaks, CA (US); David Standley, Westlake Village, CA (US); Amit Mittra, Westlake Village, CA (US)

(73) Assignee: Biomorphic VLSI, Inc., Westlake Village, CA (US)

( * ) Notice: Subject to any disclaimer, the term of this patent is extended or adjusted under 35 U.S.C. 154(b) by 430 days.

(21) Appl. No.: 10/346,235

(22) Filed: Jan. 17, 2003

(65) Prior Publication Data
US 2004/0141074 A1    Jul. 22, 2004

(51) Int. Cl.
H04N 9/73    (2006.01)
H04N 3/14    (2006.01)
H04N 5/335   (2006.01)

(52) U.S. Cl. .................. 348/223.1; 348/302; 348/308
(58) Field of Classification Search ............. 348/223.1, 348/308, 302–307
See application file for complete search history.

(56) References Cited

U.S. PATENT DOCUMENTS

| 5,122,881 | A | * | 6/1992 | Nishizawa et al. ........ 348/301 |
| 5,216,493 | A | | 6/1993 | DiBella et al. ............ 358/29 |
| 5,502,299 | A | | 3/1996 | Standley ................. 250/208.2 |
| 5,572,074 | A | | 11/1996 | Standley ................. 307/117 |
| 5,619,262 | A | | 4/1997 | Uno ..................... 348/297 |
| 5,734,426 | A | | 3/1998 | Dong .................... 348/297 |
| 5,990,471 | A | * | 11/1999 | Watanabe ............... 250/208.1 |
| 6,452,633 | B1 | | 9/2002 | Merrill et al. |
| 6,493,030 | B1 | | 12/2002 | Kozlowski et al. ........ 348/310 |
| 6,580,455 | B1 | * | 6/2003 | Wang et al. ............. 348/308 |
| 6,791,606 | B1 | * | 9/2004 | Miyano ................. 348/223.1 |
| 7,133,073 | B1 | * | 11/2006 | Neter ................... 348/272 |

FOREIGN PATENT DOCUMENTS

| EP | 1162831 | 12/2001 |
| WO | WO 99/57605 | 11/1999 |

OTHER PUBLICATIONS

"Instantaneous Automatic Light Control for CMOS Sensors" by Olsen et al, pp. 121-124; Presentation at 2005 IEEE Workshop on Charge-coupled Devices and Advanced Image Sensors, Jun. 9-11, 2005, at Nagano, Japan.

* cited by examiner

*Primary Examiner*—Lin Ye
*Assistant Examiner*—Kelly L. Jerabek
(74) *Attorney, Agent, or Firm*—Jianq Chyun IP Office

(57) ABSTRACT

A system and method for averaging incident light on plural pixels using a CMOS sensor is provided. The process includes resetting all pixels in a given region during a reset phase; and reading a voltage of a floating reset node as a function of time during a measurement phase. During the reset phase, an access select signal and a reset voltage are both high. The measurement phase begins when the access select signal is low and the reset voltage is still high. The system and method may be used to perform automatic exposure control and automatic white balancing operations.

15 Claims, 17 Drawing Sheets

SYSTEM AND METHOD FOR AUTOMATIC EXPOSURE CONTROL AND WHITE BALANCING FOR CMOS SENSORS

BACKGROUND

1. Field of the Invention

The present invention relates to image sensors, and more particularly, to automatic exposure control and white balancing using active pixel CMOS sensors.

2. Background of the Invention

Solid State or electronic image sensors consist of array(s) of photodiodes that produce an electrical signal in response to light illumination. Such image sensors can be divided into two broad categories, CCD (charge-coupled devices) and CMOS (Complementary Metal Oxide Semiconductor), depending on how the signal is read out from the photodiodes.

Typically, CCD sensors use repeated lateral transfer of charge in an analog shift register. Photo-generated electrons or holes are read out after they are shifted in appropriate positions. CCD sensors have disadvantages, for example, to perform charge shifting with high fidelity, and low loss requires specialized semiconductor fabrication processes, which are not compatible with the fabrication process used to make most solid-state integrated circuits. This increases the overall cost of the CCD sensors.

In CMOS sensors, signals from the photodiodes are read out as column readout lines, one row at a time. During readout, there is no shifting of charge from one pixel to another. Because CMOS sensors are compatible with typical CMOS fabrication processes, they allow integration of additional signal processing logic on the same substrate as the sensor array. This leads to reduction in the size and cost of a digital camera.

A highly integrated CMOS sensor chip can perform many image processing functions that are otherwise carried out by a controller, external to the sensor. Two such functions are automatic exposure (AE) control and automatic white balancing (AWB) that are described below.

Automatic exposure (AE) control: Similar to conventional film, sensors in digital cameras are exposed to light for certain duration, known as the "exposure time". For given light conditions and lens aperture, there is an optimum exposure time that produces desirable pictures. An exposure time longer than optimum results in an image that is overly bright, and it will look "washed out." An exposure time shorter than the optimum time results in an image that is "too dark and difficult to view." AE control is the ability of the sensor chip to select optimum exposure time for a given scene lighting condition, without user intervention.

Currently, AE control processes used in electronic digital cameras calculate the optimum exposure value after performing a histogram analysis on a signal strength measured at all the locations in a picture using multiple preliminary frames. One way of analyzing the signal strength distribution is to determine the actual frame mean and then to compare it with a desired frame mean. If the actual frame mean is less than the desired mean, then the exposure time is increased; otherwise, the exposure time is decreased.

Another conventional solution is to sort all pixels within an image frame into different brackets depending on their brightness. The goal is to count the number of pixels that are unacceptably bright and those that are unacceptably dark and then make an incremental adjustment to the exposure setting that tries to balance the number of pixels that are too dark with those that are too bright.

The foregoing conventional techniques have disadvantages. To determine the optimum exposure time, both the foregoing techniques require a starting point to acquire an image that is not fully saturated or completely dark for the histogram analysis. An additional photometer is required as a part of the digital camera to choose a suitable exposure starting point that is close to the optimum exposure for arbitrary light conditions. If no additional photometer is used, the first frame used by the foregoing techniques is either saturated or too dark. Consequently, conventional techniques require acquisition of several frames until the optimum exposure time is determined. If the camera is used in a snapshot mode, then there will be a noticeable delay from the time the camera trigger is pressed until the final picture is taken Conventional techniques also have to process sequentially a large number of pixels to build representative histogram data or find the mean. Since these techniques work directly on sensor output as the sensor is being scanned out, all data processing circuitry for pixel tallying must operate at pixel readout rate and thus consumes a significant amount of power during multiple frames. The power penalty may be even higher if digital pixel data is processed. In this case, all blocks in the signal processing chain from the pixel to the analog-to-digital (A/D) converter need to be powered while the AE control block is running.

Automatic white balancing (AWB): Typical solid state imaging arrays can be described as combination of multiple sub-arrays of individual color detectors. One such pattern 100 (known as the Bayer pattern) that is commonly used is shown in FIG. 1. This arrangement consists of interspersed red, green and blue (also referred to herein as R, G, B) detectors (103-101). R 103, G 102 and B 101 pixels have different light sensitivity and thus produce different signal levels even if incident light is white with equal components of red, green and blue. As a result, a white object in a scene will not appear white in an unprocessed picture. This problem is corrected by "white balancing" which adjusts signal levels for R, G and B pixels so that the image of a white object appears white in a picture. White balancing involves multiplying R, G and B pixels in an image array (e.g. 100 of FIG. 1) by certain coefficients, known as white balance (WB) coefficients. If R, G and B are raw signal levels before white balancing, then the signal levels after white balancing, $R_{WB}$, $G_{WB}$ and $B_{WB}$ may be expressed as $$R_{WB}=W_R*R \tag{1a}$$

$$G_{WB}=W_G*G \tag{1b}$$

$$B_{WB}=W_B*B \tag{1c}$$

$W_R$, $W_B$ and $W_G$ are white balance coefficients for red, green and blue, respectively for a given lighting.

Manual white balancing requires the user to point a camera at a white background and manually adjust the WB coefficients until the background appears white, for which $R_{WB}=G_{WB}=B_{WB}$. Also the WB coefficient for the color having the strongest raw signal is usually set to 1. For example, if G>B>R, then;

$$W_R=G_{white}/R_{white} \tag{2a}$$

$$W_G=1 \tag{2b}$$

$$W_B=G_{white}/B_{white} \tag{2c}$$

$R_{white}$, $G_{white}$ and $B_{white}$ are raw signals from red, green and blue pixels comprising a white object and it is assumed that $G_{white}$ is the strongest signal.

WB coefficients may be automatically determined by using equations (2a), (2b) and (2c). However, the user still needs to point the camera at a white object.

This restriction is overcome by making the assumption that real-world scenes contain equal amounts of red, green and blue colors. In other words, a typical white-balanced picture has equal means for R, G and B pixels when the means are calculated over the entire image. Under this assumption, equations (2a), (2b) and (2c) may be rewritten in terms of pixel means:

$$W_R = \overline{G}/\overline{R} \tag{3a}$$

$$W_G = 1 \tag{3b}$$

$$W_B = \overline{G}/\overline{B}, \tag{3c}$$

where $\overline{R}$, $\overline{G}$ and $\overline{B}$ are raw red, green and blue pixel means before white balancing and it is assumed (for illustration purposes) that the green mean is the highest.

Based on equations (3a), (3b) and (3c), real-life scene-based automatic white balancing requires three operations: 1) finding the mean values for R, G and B pixels; 2) finding the highest of the three means; 3) setting the WB coefficient of the color with the highest mean to 1, and finding the other two WB coefficients as ratios of the frame means. The three color means are representative only for a picture with intermediate frame brightness. A saturated picture or a picture that is too dark will not carry useful color information. Therefore white balancing will be accurate only after AE control is complete, which, as discussed earlier, takes several frames in conventional implementations.

Conventional AWB techniques have disadvantages. One such disadvantage is that conventional processes require several frames. Typically the user has to hold the camera still during this entire period since it is not clear when this process is completed by a digital camera and the actual picture is "saved." Additional problems with conventional digital signal processing (DSP) or ASIC based implementations of the foregoing processes require additional chip area and power consumption. These limitations make the conventional processes impractical for single-chip digital camera applications.

Therefore what is required is a system and process for efficiently performing auto-exposure control and white balancing for the modern, single-chip digital cameras.

SUMMARY OF THE INVENTION

In one aspect of the present invention, a method for averaging incident light on plural pixels (or pixel array) in a CMOS sensor is provided. The method includes resetting all pixels in a given region during a reset phase; and reading a voltage of a floating access node as a function of time during a measurement phase. During the reset phase, a signal external to the pixel array and a reset signal are similar. The measurement phase begins when the signal is low and the reset signal is still high.

In one aspect of the present invention, a system for averaging incident light on plural pixels (pixel array) using a CMOS sensor is provided. The system includes a voltage node common to plural pixels in a pixel array that provides a floating access voltage; a reset voltage source that provides a reset voltage to plural photodiodes; a reset signal that controls plural reset transistors; and a switch between the common voltage node and reset voltage source, wherein the operation of the switch is controlled by a signal external to the pixel array.

During a reset phase the signal external to the pixel array and the reset signal are similar for all pixels and the access voltage and reset voltage are substantially similar in value. A measurement phase begins when the external signal is low, while the reset signal is high. During the measurement phase a photodiode and a junction capacitor are in parallel to each other and a change in the access voltage over time indicates an average response of pixels to any incident illumination.

In another aspect of the present invention, an analog circuit for performing automatic exposure control for a CMOS sensor using pixel charge sharing is provided. The analog circuit includes the voltage node common to plural pixels in a pixel array that provides a floating access voltage; the reset voltage source that provides a reset voltage to plural transistors in the analog circuit; and the switch between the common voltage node and reset voltage source, wherein the operation of the switch is controlled by the signal external to the pixel array.

In another aspect, a method used in the analog circuit for performing automatic exposure control for a CMOS sensor using pixel charge sharing is provided. The method includes, resetting all pixels in a given region during a reset phase; and reading a voltage of a floating access node as a function of time during a measurement phase.

In yet another aspect of the present invention, an analog circuit for performing white balancing using a CMOS sensor by selectively applying pixel charge sharing to a pixel array is provided. The circuit includes, a first access node that provides a first access voltage to at least one pixel; at least a second access node that provides a second access voltage to at least a second pixel; a first access switch that operationally couples the first access node to a reset voltage source; a second access switch that operationally couples the second access node to the reset voltage source; a first reset switch that controls the pixels in even rows of the pixel array; and a second reset switch that controls the pixels in odd rows of the pixel array.

The circuit includes a first parasitic capacitor operationally coupled to the first access node and a second parasitic capacitor operationally coupled to the second access node. A signal external to the pixel array controls the first and second access switches and a first reset signal controls the first reset switch and a second reset signal controls the second reset switch.

During a reset phase if the first reset signal is high and the second reset signal is low then a pixel in an even row is coupled to the first access or second access node such that the first access node and second access node voltage is equal to a reset voltage. During a measurement phase the change in the first access node voltage or the second access node voltage provides a pixel response of the pixel coupled to the first access node or second access node.

During the reset phase if the first reset signal is low and the second reset signal is high then a pixel in an odd row is coupled to the first access or second access node such that the first access node and second access node voltage is equal to a reset voltage. Also, during the measurement phase the change in the first access node voltage or the second access node voltage provides a pixel response of the pixel coupled to the first access node or second access node.

In yet another aspect of the present invention, a method for performing white balancing using a CMOS sensor by selectively applying pixel charge sharing to a pixel array is provided. The method includes, coupling at least a first pixel to a first common node voltage during a reset phase; and coupling at least a second pixel to a second common node voltage during the reset phase.

In one aspect, the present invention overcomes the aforementioned problems associated with conventional AE control and AWB techniques. Pixel averaging in the present invention is implemented in the analog domain and it is designed such that the analog circuit does not process pixel data sequentially. Instead, the averaging operation is accomplished in one step by pixel charge sharing and this computation is performed in the imaging array itself. Due to the parallel nature of this computation the duration of the averaging process is independent of the number of pixels to be averaged and takes only a fraction of the time used by conventional techniques. Moreover, the obtained pixel average is always proportional to the average illumination; i.e., there is no saturation effect. As a result, both AE control and AWB can be completed in less than a frame, as opposed to several frames when the conventional techniques are used.

In another aspect of the present invention, since pixels are not read out sequentially, the entire readout and signal processing chain can be powered down during AE control and AWB operation. The present invention thus offers substantially decreased running time for performing AE control and AWB as well as significant reduction in the power dissipation.

In yet another aspect of the present invention, the pixel averages for each color are available as analog quantities to determine the WB coefficients given by equations (3a) and (3c), which saves chip area in the digital domain.

In yet another aspect of the present invention, no modification is required to the three-transistor active pixel sensor, commonly used in CMOS imagers. Only a single switch may be added between the access node and the reset voltage source, which is external to the imaging array.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate but not to limit the invention. The drawings include the following Figures.

DETAILED DESCRIPTION OF THE PREFERRED EMBODIMENTS

APS Imaging Array Operation

To facilitate an understanding of the preferred embodiment, the general architecture and operation of an active pixel sensor (APS) imaging array will first be described. The specific architecture and operation of the preferred embodiment will then be described with reference to the general operation of a modified APS array according to one aspect of the present invention.

Figure 2:
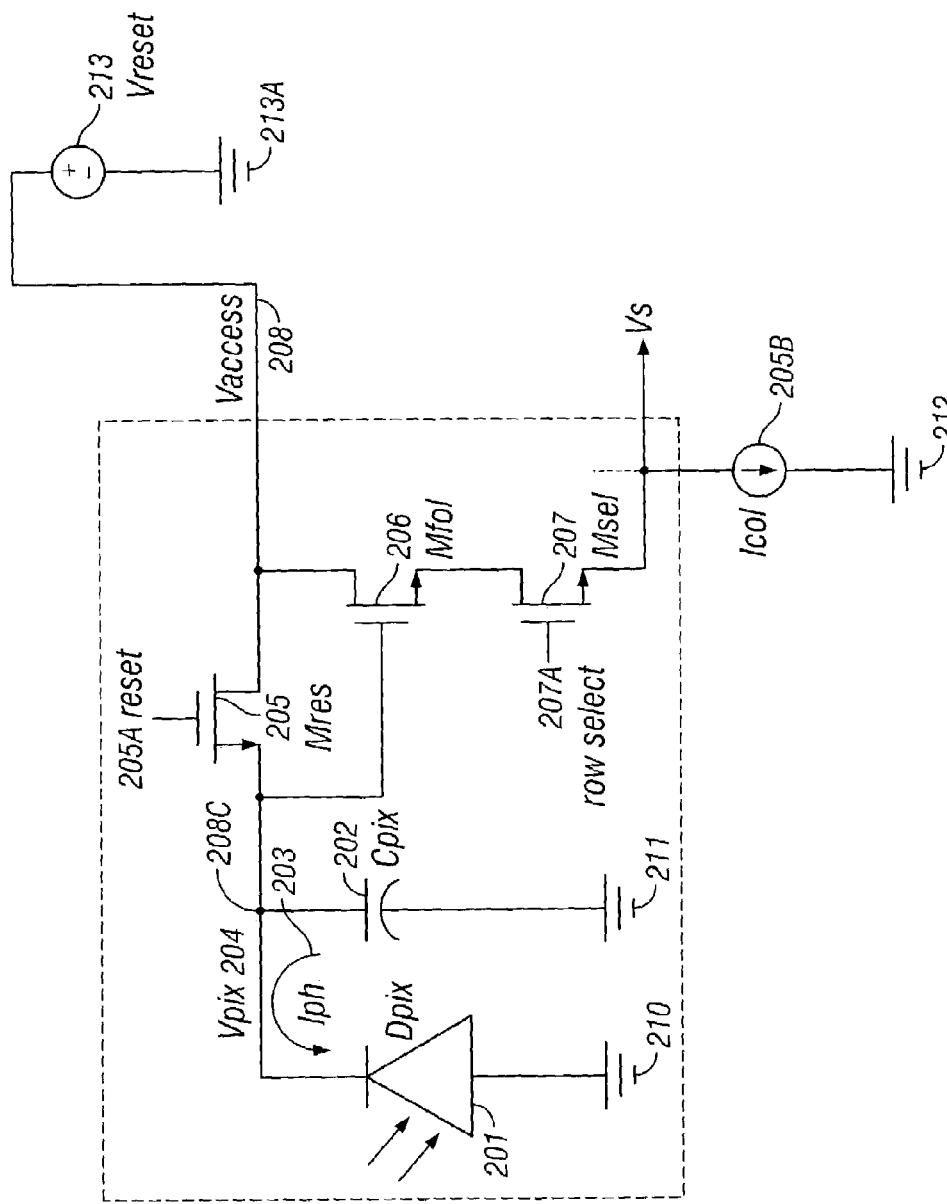
FIG. 2 shows a schematic of a three-transistor active pixel sensor (APS) in an imaging array.

FIG. 2 shows a schematic of a three-transistor APS 200, commonly used as a pixel element in CMOS sensors. APS pixel 200 includes a photodiode $D_{pix}$ 201 with junction capacitor $C_{pix}$ 202, reset transistor $M_{res}$ 205, source follower transistor $M_{fol}$ 206 and select transistor $M_{sel}$ 207. Node $V_{access}$ 208 is common to all APS pixels and is connected to a reset voltage $V_{reset}$ 213.

When a reset signal 205A to APS pixel 200 is high, $V_{pix}$ node 204 is connected to node $V_{access}$ 208 through reset transistor $M_{res}$ 205, which is on at that instance. This charges capacitor $C_{pix}$ 202 to a voltage $V_{reset}$ 213 and photodiode $D_{pix}$ 201 is reverse biased.

When $V_{pix}$ 204=$V_{reset}$ 213, reset transistor $M_{res}$ 205 may be turned off, which leaves node $V_{pix}$ 204 floating and photodiode current $I_{ph}$ 203 (the photo generated current), begins to discharge capacitor $C_{pix}$ 202. As a result, pixel voltage $V_{pix}$ 204 decreases at a rate proportional to $I_{ph}$ 203. The exposure time for APS pixel array 200 is the period between the end of the reset phase (when $M_{res}$ 205 is turned off) and when the pixel voltage $V_{pix}$ 204 is read out. For illustration purposes, if the value of $V_{pix}$ 204 at the time when it is read out is $V_{pix,RO}$, then $V_{pix,RO}$ is converted to a digital value, proportional to the light intensity incident on the pixel. Therefore, to produce intermediate picture brightness, $V_{pix,RO}$, averaged over an entire frame should be in an appropriate range. This is achieved by choosing an appropriate exposure time for any given light intensity.

Pixel Charge Sharing: In one aspect of the present invention, a method and system is provided for averaging light incident on a group of pixels by charge sharing. The group of pixels may be an entire pixel array or a subset thereof, such as all red, or green, or all blue pixels.

Figure 3:
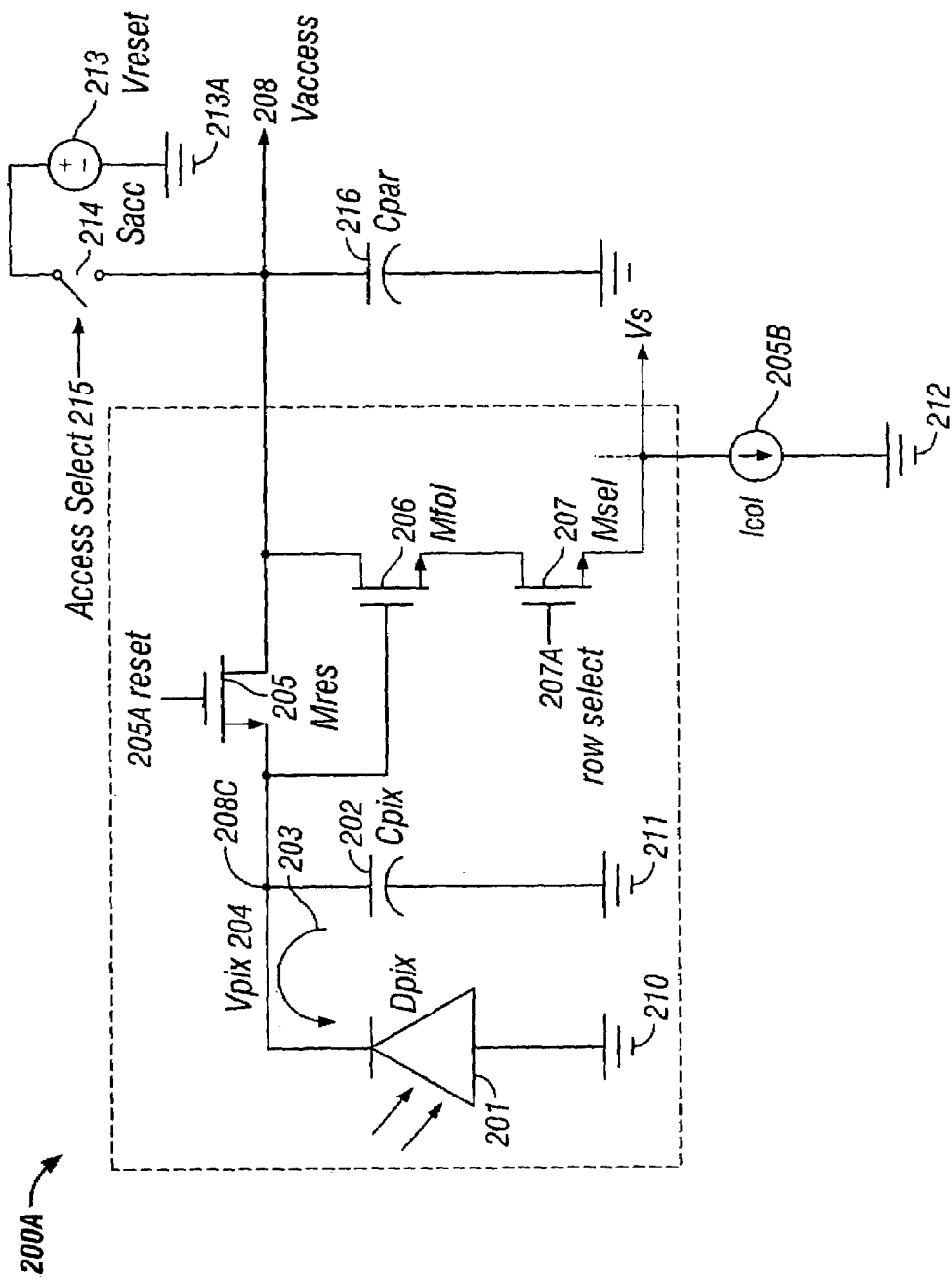
FIG. 3 shows a schematic of a column of APS pixels with an added access switch for pixel charge sharing, according to one aspect of the present invention.

FIG. 3 shows a system 200A for averaging pixels in a sensor (may also be referred to herein as "imager") according to one aspect of the present invention. $V_{access}$ 208 is common to all pixels and is coupled to a parasitic capacitor $C_{par}$ 216. In one aspect of the present invention, pixel charge sharing may be achieved by introducing a switch $S_{acc}$ 214 between $V_{access}$ node 208 and $V_{reset}$ 213. Switch $S_{acc}$ 214 may be controlled by an access select signal 215 that is external to pixel array 200A. In one aspect of the present invention, when access select signal 215 is high, $S_{acc}$ 214 is closed and when access select signal 215 is low, $S_{acc}$ 214 is open.

Averaging a chosen region of pixels by charge sharing can be accomplished by first resetting the pixels in the chosen region. This is followed by a node voltage read out phase (measurement phase), during which period the voltage of the floating reset network node is monitored as a function of time.

Figure 4:
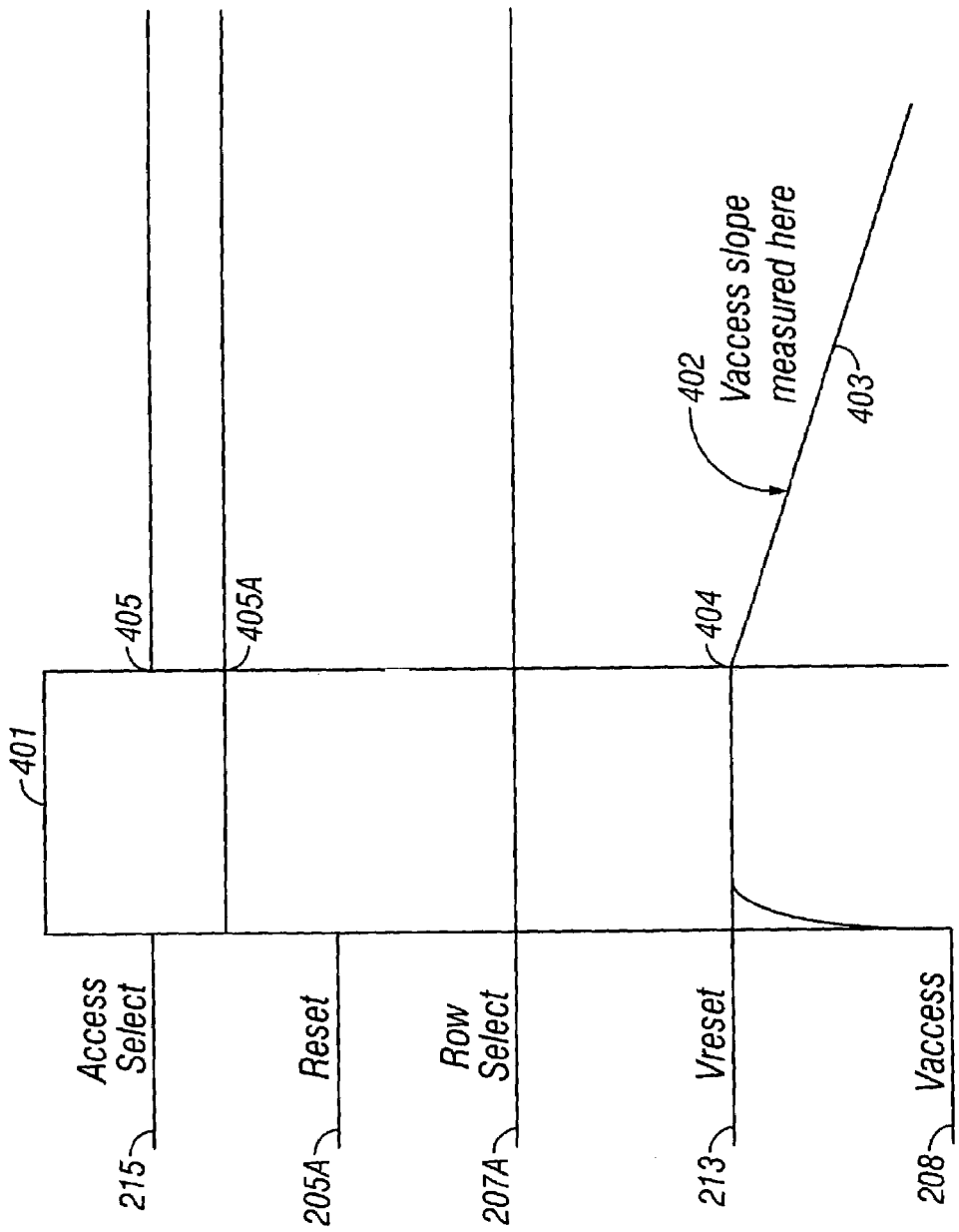
FIG. 4 shows a timing diagram of signals for pixel charge sharing when all pixels in an imaging array are averaged, according to one aspect of the present invention.

FIG. 4 illustrates a timing diagram, according to one aspect of the present invention, for finding the average intensity values of a group of pixels. The timing diagram shows the relationship between access select signal 215, reset signal 205A, row select signal 207A, $V_{access}$ voltage 208, and $V_{reset}$ voltage 213.

When row select signal 207A is low then transistors $M_{fol}$ 206 and $M_{sel}$ 207 are off. For illustration purposes only, each pixel element may be simplified to include only photodiode $D_{pix}$ 201 with capacitance $C_{pix}$ 202 and reset transistor $M_{res}$ 205. During reset phase 401, both access select signal 215 and reset signal 205A are high, and so for all pixels, transistor $M_{res}$ 205 is on such that $V_{pix}$ 204=$V_{access}$ 208=$V_{reset}$ 213. The measurement phase 403 begins when access select signal 215 becomes low at 405 and reset signal 205A is still high at 405A. All pixels still remain connected to $V_{access}$ 208 and thus to each other, but $V_{access}$ 208 now floats. During measurement phase 403, individual pixel photodiodes $D_{pix}$ 201 and junction capacitors $C_{pix}$ 202 are in parallel with each other.

Figure 5A:
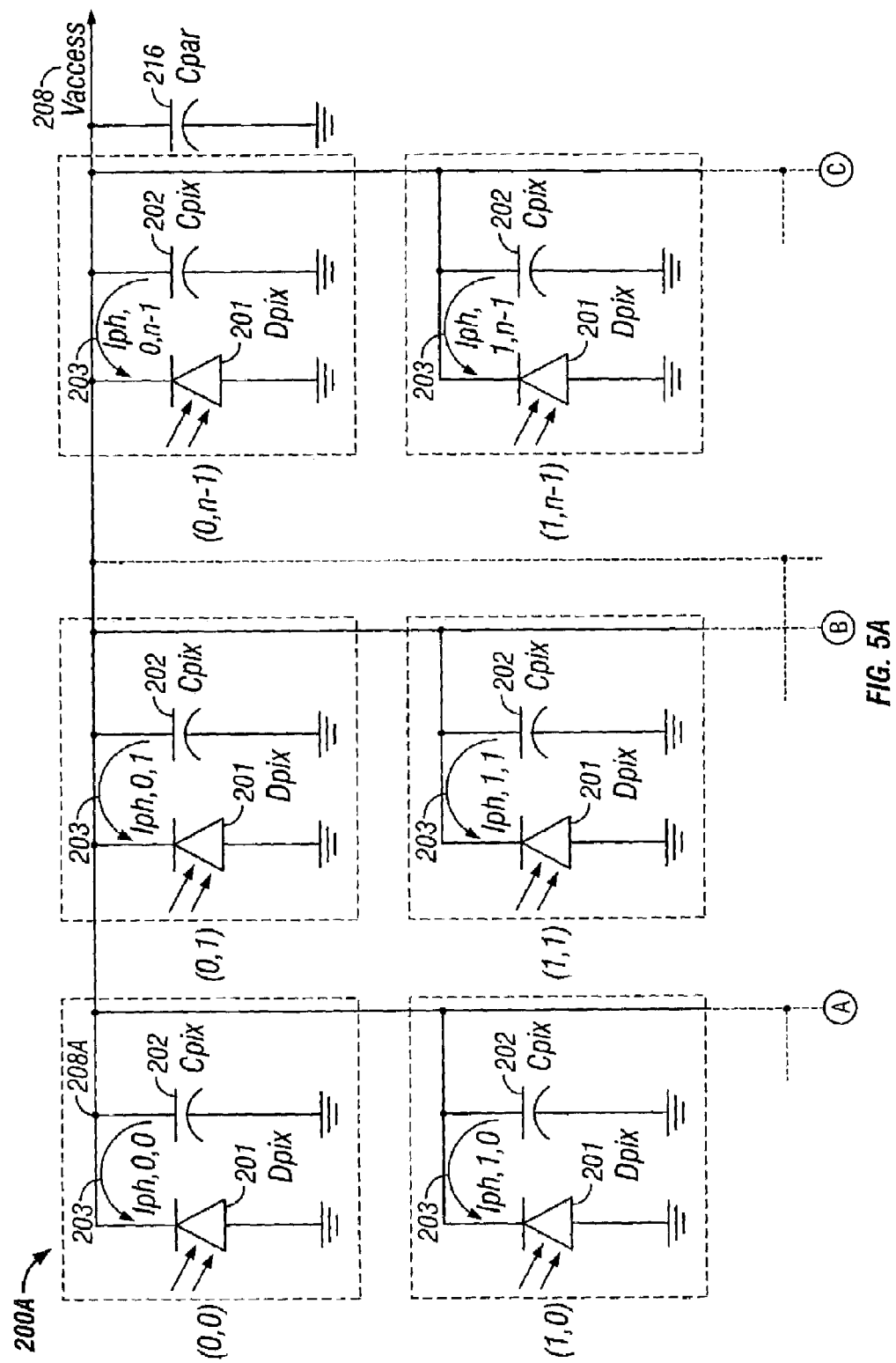
FIGS. 5A and 5B show an equivalent circuit during pixel charge sharing when all pixels in an imaging array are averaged, according to one aspect of the present invention.
Figure 5B:
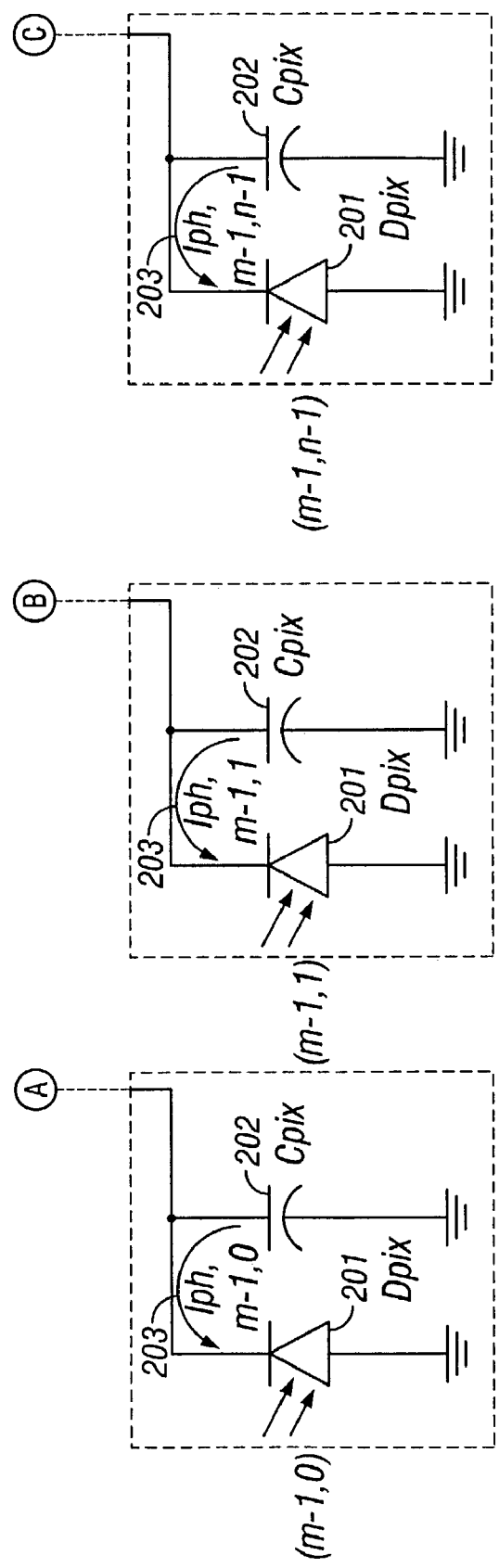

This is also illustrated in FIGS. 5A-5B for a m×n pixel array. The charge on every pixel is shared among all pixels and the individual photodiode currents work in parallel to discharge this total charge. The total capacitance from $V_{access}$ 208 to ground is:

$$C_{tot} = NC_{pix} + C_{par}, \quad (4)$$

where N=m×n is the total number of pixels. The total photodiode current, $$I_{ph,tot} = \sum_{i=0}^{m-1} \sum_{j=0}^{n-1} I_{ph,i,j} = \sum_{k=1}^{N} I_{ph,k}, \quad (5)$$

discharges the total capacitance $C_{tot}$. Therefore, the rate of decrease of $V_{access}$ 208 is $$\frac{dV_{access}}{dt} = \frac{\sum_{k=1}^{N} I_{ph,k}}{NC_{pix} + C_{par}}. \quad (6)$$

Since the average photodiode current over the total number of pixels N is $$\bar{I}_{ph} = \frac{1}{N} \sum_{k=1}^{N} I_{ph,k}, \quad (7)$$

equation (6) may be expressed as $$\frac{dV_{access}}{dt} = \frac{\bar{I}_{ph}}{C_{pix} + \frac{C_{par}}{N}}. \quad (8)$$

The behavior of $V_{access}$ 208 as a function of time is shown in FIG. 4. During the measurement phase 403, $V_{access}$ 208 decreases (as shown by slope 402) with a rate proportional to the average photocurrent, or equivalently, to the average light intensity over the entire image array. In one aspect of the present invention, by measuring the temporal slope 402 of $V_{access}$ 208 during measurement phase 403, the average response of all pixels to incident illumination can be determined, which provides automatic exposure control.

Finding RGB averages for AWB: In one aspect of the present invention, the system and method for determining pixel intensity average using pixel charge sharing may be utilized to average any group of pixels instead of the entire pixel array. The pixels to be averaged use common node $V_{access}$ 208 that is connected to $V_{reset}$ 213 through access switch $S_{acc}$ 214. The pixels whose average is not required may have their access node directly connected to reset voltage 213. For AWB, the R, G and B averages are determined separately to calculate the WB coefficients as described above with respect to equations (3a), (3b) and (3c).

Figure 6:
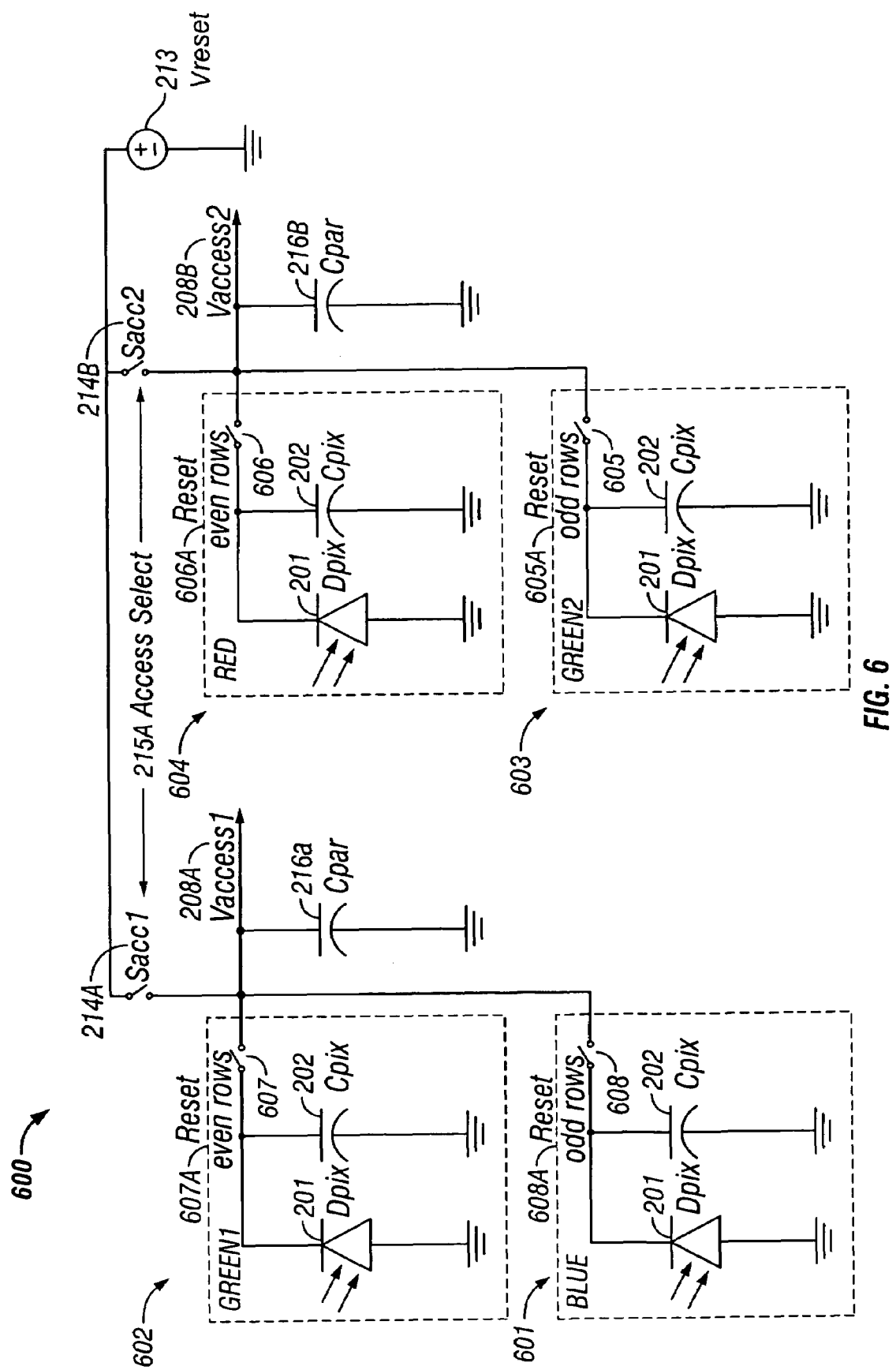
FIG. 6 shows an implementation of pixel charge sharing when red, green and blue pixels are averaged separately, according to one aspect of the present invention.

In one aspect of the present invention, FIG. 6 shows a circuit diagram for finding color averages for a pixel array (for example, pixel array 100 (FIG. 1)). For illustration purposes, green pixels on even rows may be designated as G1 602, and the green pixels on odd rows as G2 603. The pixels in even columns (G1 602 and B 601) share access node $V_{access1}$ 208A while the pixels in odd columns (R 604 and G2 603) share access node $V_{access2}$ 208B. Nodes $V_{access1}$ 208A and $V_{access2}$ 208B have corresponding parasitic capacitors 216A and 216B. Nodes $V_{access1}$ 208A and $V_{access2}$ 208B connect to reset voltage $V_{reset}$ 213 through two switches $S_{acc1}$ 214A and $S_{acc2}$ 214B, both controlled by access select signal 215A. Reset switches 607 and 606 in all even row pixels are controlled by a $reset_{even\ rows}$ signal (607A and 606A). Reset switches 608 and 605 in all odd row pixels are controlled by $reset_{odd\ rows}$ signal (608A and 605A).

Figure 7:
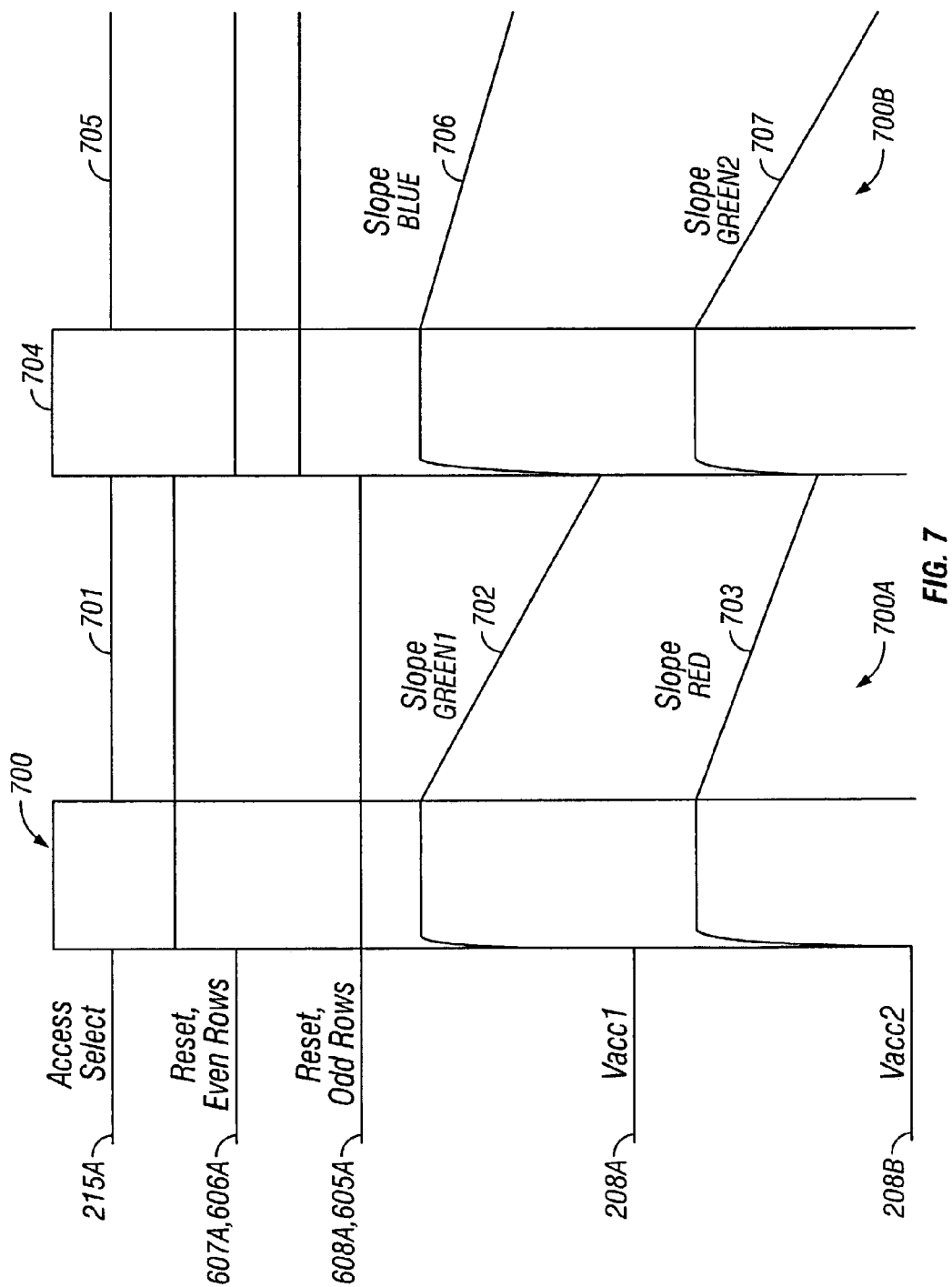
FIG. 7 shows a timing diagram of signals for pixel charge sharing when red, green and blue pixels are averaged separately, according to one aspect of the present invention.

FIG. 7 shows a timing diagram for signals access select 215A, $reset_{even\ rows}$ (607A and 606A) and $reset_{odd\ rows}$ (608A and 605A) with two stages (700A and 700B) each including (1) a reset phase and (2) a measurement phase. (The row select signal, not shown in the diagram, is common to the entire pixel array and is low in both stages).

During the reset phase 700 of stage I 700A, $reset_{even\ rows}$ 607A/606A are high and $reset_{odd\ rows}$ 608A/605A are low and therefore G1 602 pixel is connected to $V_{access1}$ 208A and R pixel 604 is connected to $V_{access2}$ 208B. Both $V_{access1}$ 208A and $V_{access2}$ 208B are first reset to $V_{reset}$ 213 when access select signal 215A is high (reset phase 700), and then float when access select signal 215A is low (measurement phase 701).

During the measurement phase 701 of stage I 700A, slopes of $V_{access1}$ 702 and $V_{access2}$ 703 provide an average of G1 pixel 602 response and R pixel 604 response, respectively.

During stage II 700B, $reset_{even\ rows}$ signals 607A/606A are low and $reset_{odd\ rows}$ signals 608A/605A are high and nodes $V_{access1}$ 208A and $V_{access2}$ 208B are connected to blue pixel 601 and G2 pixel 603, respectively. A measurement of slopes 706 (for $V_{access1}$ 208A) and 707 for $V_{access2}$ 208B) during measurement phase 705 of stage II 700B provides the average of blue pixel 601 and G2 603 pixel response, respectively.

Hence, R, G and B pixel means for an array (101, FIG. 1) may be determined in two stages of pixel charge sharing. The first stage yields the average values of G1 602 and R 604 and the second stage yields the average values of B 601 and G2 603. Either G1 602 or G2 603 can be used to represent the green response.

WB coefficients are then determined using the average values of R, G and B stored as voltage quantities. In one aspect of the present invention, both $V_{access1}$ 208A and $V_{access2}$ 208B are sampled at a certain time, t, after access select signal 215A goes low in each stage (700A and 700B). For purposes of illustration, sampled voltages may be designated as $V_{G1,s}$ and $V_{R,s}$ (from stage I, 700A) and $V_{B,s}$ and $V_{G2,s}$ (from stage II, 700B). The voltage quantities proportional to R, G and B means are determined by $V_{reset}-V_{R,s}$, $V_{reset}-V_{G2,s}$ and $V_{reset}-V_{B,s}$.

The pixel color with the highest mean may then be determined. For example, if green pixels have the highest mean, then the WB coefficients can be calculated as $$W_R = \frac{V_{reset} - V_{G2,s}}{V_{reset} - V_{R,s}} \quad (9a)$$

$$W_G = 1 \quad (9b)$$

$$W_B = \frac{V_{reset} - V_{G2,s}}{V_{reset} - V_{B,s}}. \quad (9c)$$

Slope Measurement:

There are several methods for measuring slope(s) 402, 702, 703, 706 and/or 707 discussed above with respect to FIGS. 4 and 7, respectively. The following provides examples of measuring the change in voltage over time, according to various adaptive aspects of the present invention. It is noteworthy that the present invention is not limited to any particular slope measuring technique.

Figure 8A:
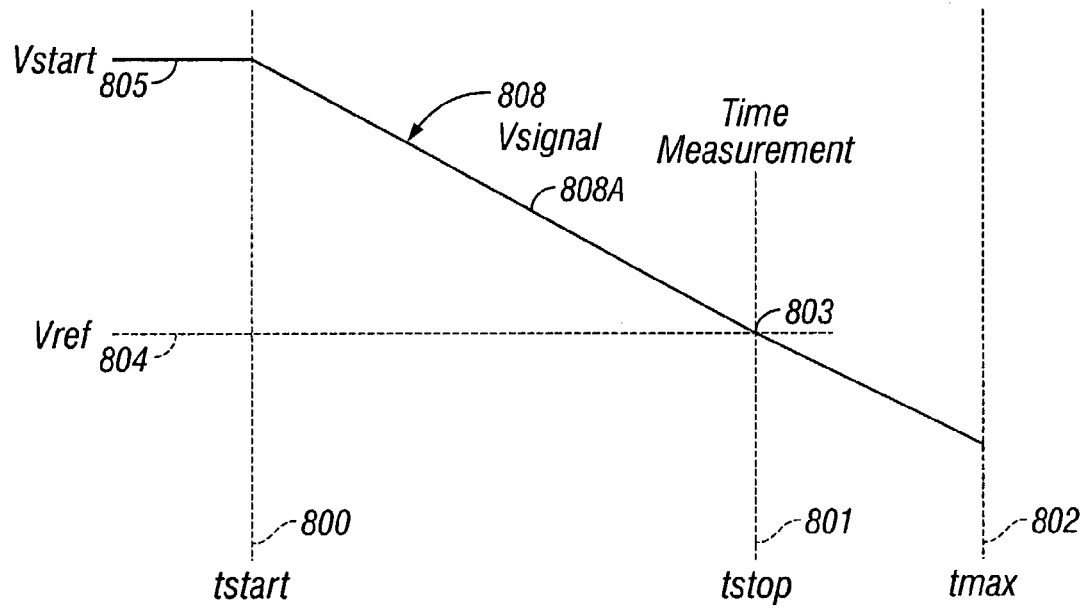
FIGS. 8A-8D show a signal slope diagram and associated slope measurement system for automatic exposure control, according to one aspect of the present invention.

Voltage Measurement for AE Control:

For AE control, a voltage signal may decrease at a constant rate and have a large range of possible values. This would be the situation when a camera is being used outdoors, where illumination is constant but can have a wide range of values. AE control typically has a time limit imposed by the user. FIG. 8A provides a graphical illustration of the change in voltage signal 808 over time. In FIG. 8A, the slope 808A is relatively steep (compared to slope 807A in FIG. 8B), and voltage Vsignal 808 crosses a fixed voltage Vref 804 at a time tstop 801, which is before the maximum period for AE, tmax 802. Hence, the time measurement 803 in FIG. 8A provides slope 808A.

Figure 8B:
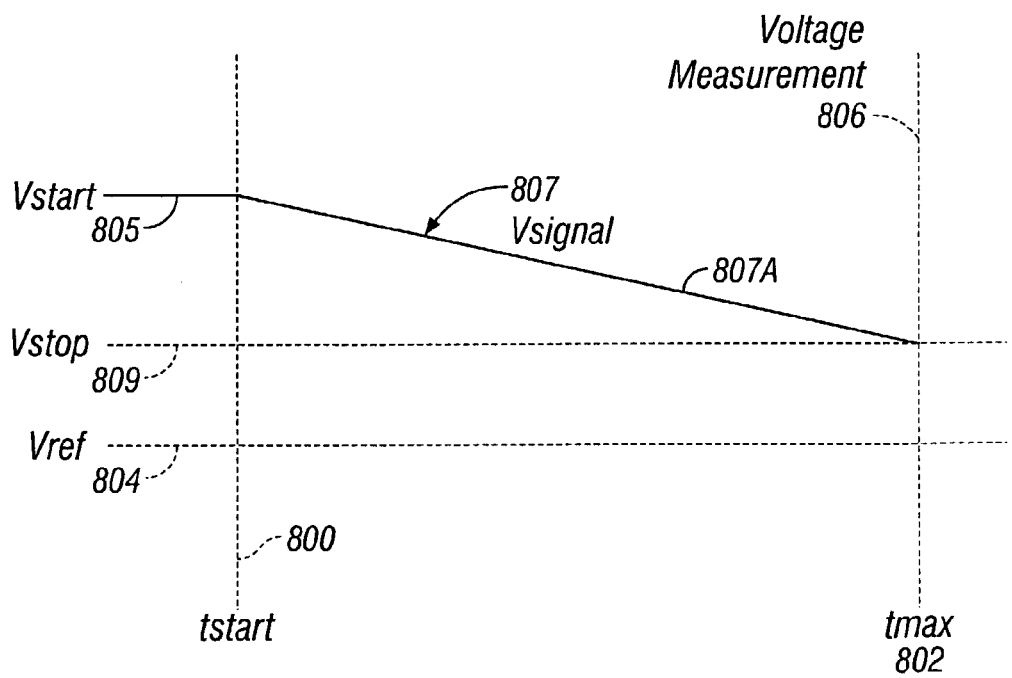

FIG. 8B shows another Vsignal 807, where the slope 807A is not steep relative to slope 808A. In this example, Vsignal 807 does not reach Vref 804. Hence, a voltage measurement 806 at time tmax 802 provides slope 807A.

Figure 8C:
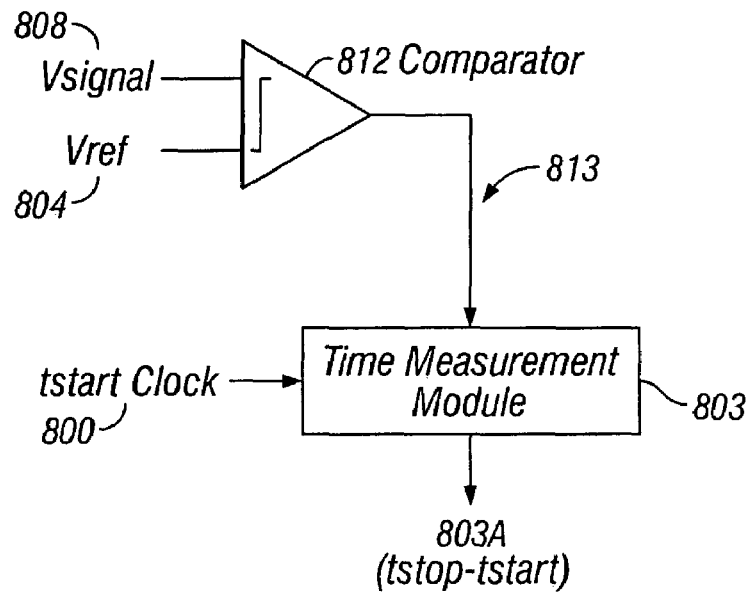

FIG. 8C shows a block diagram of a system 813 to measure tstop 801, according to one aspect of the present invention. Vsignal 808 (Vaccess 208) and Vref 804 are compared by comparator 812. The result 813 is sent to a time measurement module 803. A tstart 800 clock signal is also sent to time measurement module 803 that generates the time difference 803A between tstop 801 and tstart 800. Signal 803A is then sent to a multiplier (not shown) for normalization.

Figure 8D:
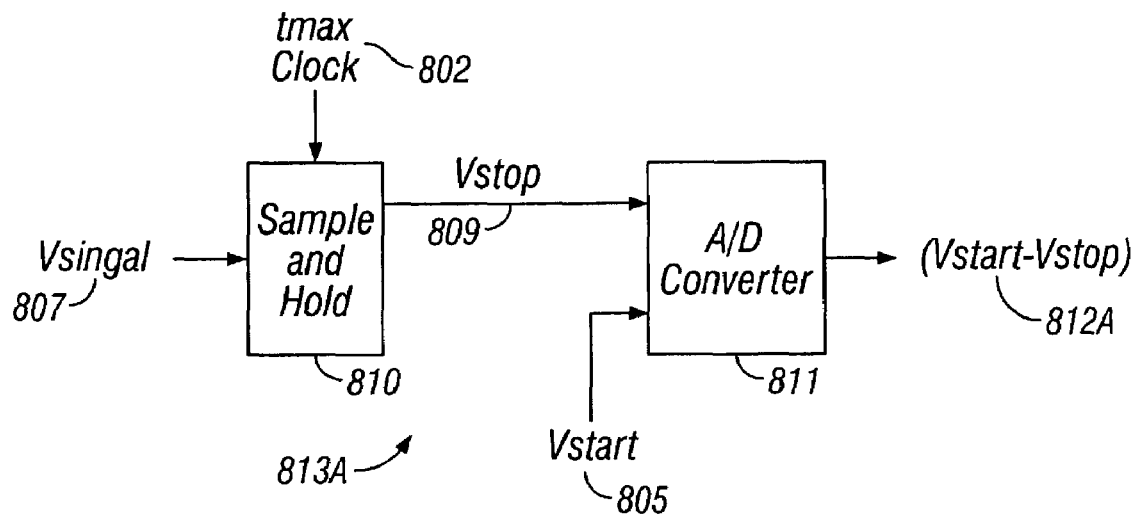

FIG. 8D shows a block diagram of a system 813A, according to one aspect of the present invention, to measure the difference between Vstart 805 (similar to Vreset 213) and Vsignal 807 (similar to Vaccess 208). Vsignal 807 is sent to a sample/hold module 810 which also receives a clock signal for tmax 802. Signal Vstop 809 is sent to an A/D converter 811 that also receives Vstart 805 as input. The difference between Vstart 805 and Vstop 809 is generated as signal 812A.

Figure 9A:
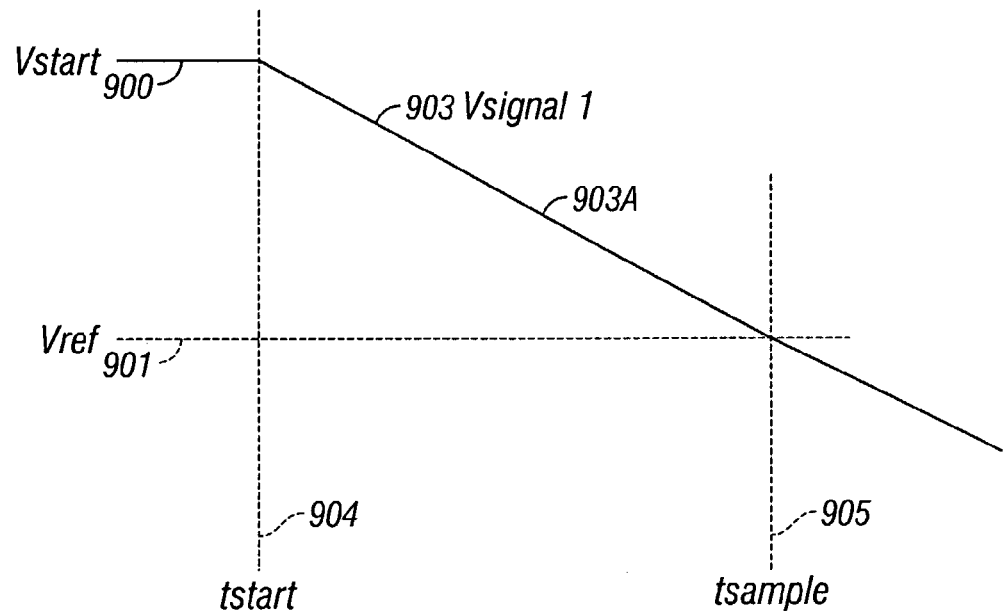
FIGS. 9A-9C show a pair of signals slope diagrams and an associated slope ratio measurement system for white balancing, according to yet another aspect of the present invention.
Figure 9B:
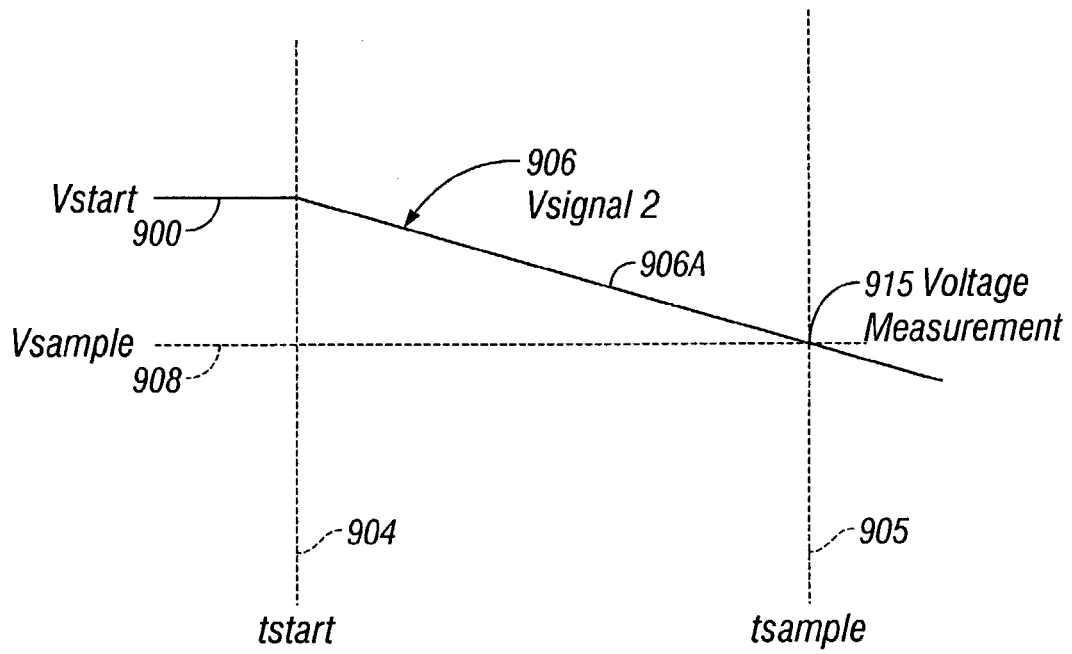

Slope Measurement for AWB:

FIGS. 9A and 9B show two voltage signals (903 and 906) of varying slopes. Here Vsignal1 903 has a steeper slope 903A than Vsignal2 906 slope 906A. In this example, Vsignal1 903 may be Vaccess1 208A and Vsignal2 906 may be Vaccess2 208 B (FIG. 7) during the first interval (stage I 700A), to get the slope ratio between G1 602 and R pixel 604.

During the second interval (stage II 700B), the foregoing may also be chosen to get the slope ratio between G2 603 and B pixel 601.

Figure 9C:
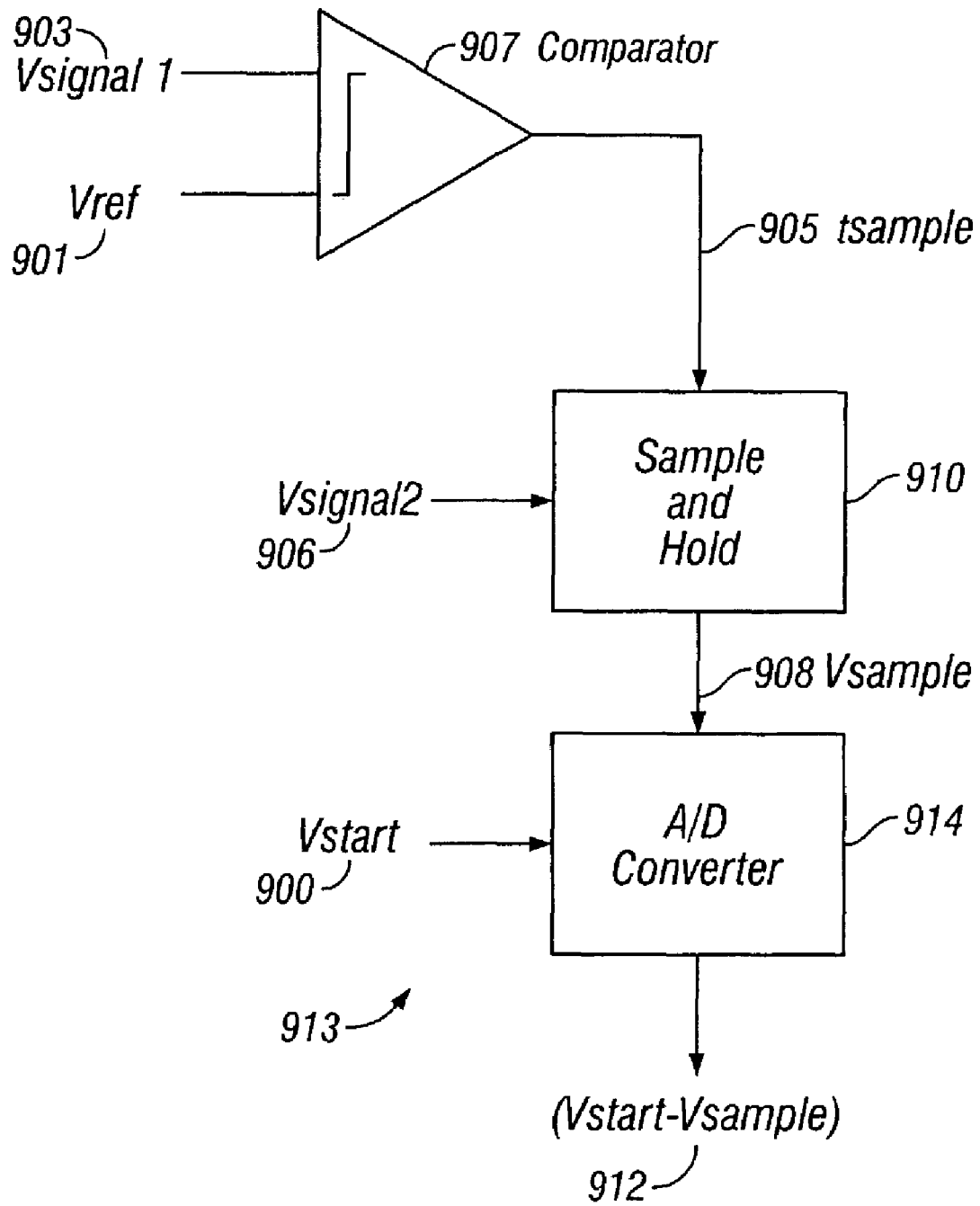

FIG. 9C shows system 913 that measures the ratio of these slopes (903A and 906A), which may be used in an AWB system of the present invention, as discussed above.

When Vsignal1 903 crosses Vref 901, voltage Vsignal2 906 may be sampled and converted by analog/digital (A/D) converter 914. The difference 912 (Vstart 900–Vsample 908) indicates the ratio as normalized to (Vstart 900–Vref 901). If a time constraint is imposed, then Vsignal1 903 must have a steep enough slope, just like the system of FIG. 8B.

FIGS. 10A-10D provide block diagrams for implementing the method/systems discussed above with respect to FIGS. 3 and 6, in yet another aspect of the present invention. FIGS. 10A-10D are based on a two-channel, two-stage R, G and B pixel averaging process described earlier. AE control is completed in stage 1 while AWB is completed only after both stage 1 and stage 2 are complete. If the user decides to bypass AWB, then only AE control may be performed in stage 1, and stage 2 is skipped.

Figure 10A:
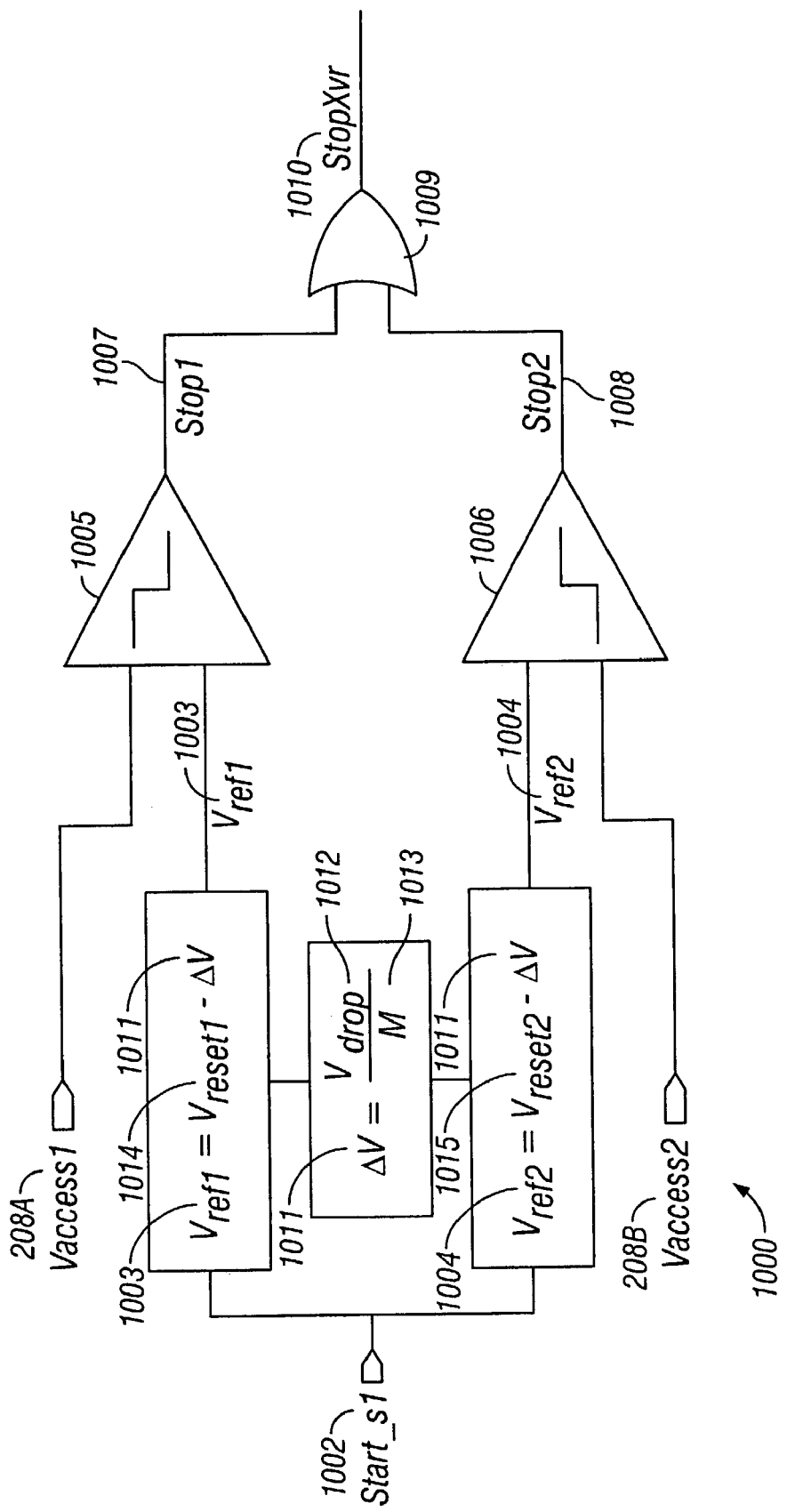
FIGS. 10A-10D show block diagrams for implementing automatic exposure control and white balancing, according to yet another aspect of the present invention.

$V_{access1/2}$ Monitoring circuit (FIG. 10A). $V_{access}$ monitoring circuit 1000 generates a timing signal if either $V_{access1}$ 208A or $V_{access2}$ 208B falls below a reference voltage. In order to account for mismatches, the actual reset levels $V_{reset1}$ 1014 and $V_{reset2}$ 1015 for even and odd columns are sampled at the beginning of stage 1 (on the rising edge of start_s1 1002 signal) and stage 2 (on the rising edge of start_s 2 1032 (FIG. 10C)). The reference voltages $V_{ref1}$ 1003 and $V_{ref2}$ 1004 for even and odd columns are then established by subtracting a common voltage Δ V 1011 from sampled reset levels $V_{reset1}$ 1014 and $V_{reset2}$ 1015 respectively. The reset level sampling and subtraction of Δ V 1011 may be implemented in a switched capacitor opamp circuit using offset-canceling, as is known in the prior art.

The voltage $$\Delta V 1011 = \frac{V_{drop} 1012}{M 1013} \quad (10)$$

is generated using a resistor ladder-based reference circuit. Its value is dependent on user-supplied parameter M 1013=1, 2, 4, 8 or 16 and on $V_{drop}$ 1012, which is the drop in access voltage that corresponds to an image frame with intermediate brightness. Choosing a higher M 1013 and thus a smaller Δ V 1011 leads to time saving, because $V_{access1}$ 208A or $V_{access2}$ 208B will cross the reference sooner, yet a smaller value of Δ V 1011 is more difficult to resolve in the comparator (1005 or 1006). The actual value for M 1013 is a compromise between these two factors. The signal stop1 1007 will go high whenever $V_{access1}$ 208A≦$V_{ref1}$ 1003. Similarly, the signal stop2 1008 will go high whenever $V_{access2}$ 208B≦$V_{ref2}$ 1004. Therefore stopXvr 1010 will go high as soon as the channel with the higher slope ($V_{access1}$ 208A or $V_{access2}$ 208B) drops by Δ V 1011.

Figure 10B:
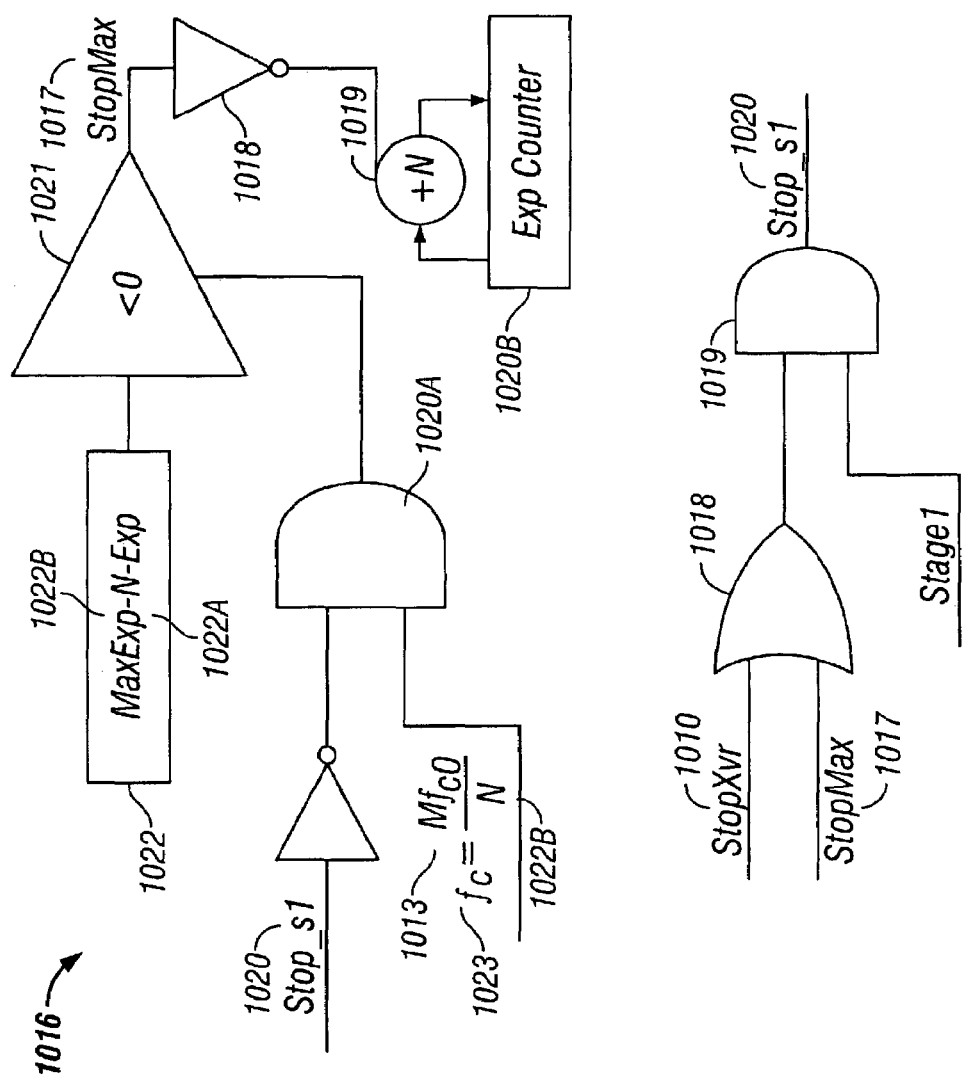

Automatic Exposure Control Counter (FIG. 10B). For AE control, exposure counter 1020B generates a digital word to be written to the exposure register (not shown) of the sensor. The exposure counter 1020B is reset to zero on the rising edge of start_s1 1002. After that it starts counting in a step of N 1022B≧1, which is a user adjustable parameter. Selecting a step N>1 forces the exposure time to be a multiple of a certain time period. This proves advantageous when image flicker (as may be caused by luminescent lighting, for example) needs to be suppressed. Each time exposure counter 1020B is incremented, its value Exp is compared against MaxExp-N, where MaxExp 1022A is a parameter provided by the user indicating the maximum exposure time not to be exceeded by the AE control. If Exp≧MaxExp−N, then the signal stopMax 1017 goes high and therefore stop_s1 1020 goes high. Signal stop_s1 1020 also goes high when $V_{access1}$ 208A or $V_{access2}$ 208B crosses the reference in stage 1 (i.e. when stopXvr 1010 goes high).

When stop_s1 1020 goes high, exposure counter 1020B stops and its value can be transferred to the exposure register (not shown). It follows that the exposure time is based either on pixel average of G1 602 or R pixels 604, whichever is higher, or is limited to MaxExp 1022 A in low light conditions.

The frequency $f_c$ 1023 at which exposure counter 1020B is run depends on user-supplied parameters M 1013 and N 1022B and voltage Δ V 1011. If M1013=N 1022B=1, then $f_c=f_{c0}$ and Δ V 1011=$V_{drop}$1012. Because $V_{drop}$ 1012 corresponds to intermediate frame brightness, then time Δ $t_{exp}$ in which $V_{access1}$ 208A or $V_{access2}$ 208B drops by $V_{drop}$ 1012 is the desired exposure time for given light conditions. This means that in a time Δ$t_{exp}$, exposure counter 1020B reaches a setting that will correspond to an exposure time of Δ $t_{exp}$. In other words, for M1013=N1022B=1, the exposure counter 1020B runs at the same speed as in an actual image frame acquisition. For every $1/f_{c0}$ step exposure counter 1020B is incremented by N=1, and $1/f_{c0}$ is the time duration corresponding to one exposure unit in the exposure register. More generally, if exposure counter 1020B is incremented by a step of N 1022B, then the counting frequency is $f_{c0}/N$ 1022B in order to achieve the same exposure setting, regardless of N 1022B, in time Δ $t_{exp}$.

For a higher value of M1013, ΔV 1011 is smaller, and so $V_{access1}$ 208A or $V_{access\,2}$ 208B cross the reference earlier, which stops exposure counter 1020B earlier. However the exposure time should not depend on the choice of Δ V 1011 but instead on the light intensity. Therefore, as $V_{drop}$ 1012 is decreased by a factor of M 1013, the counting frequency $f_{c0}$ must be increased by the same factor of M 1013 in order to maintain correct reporting of the exposure time. In summary, the counting frequency $f_c$ 1023 of the exposure counter 1020B is:

$$f_c = \frac{M f_{c0}}{N} \quad (11)$$

The user-provided parameter M 1013 affects the time spent in stage 1 and stage 2. This time is equal to Δ $t_{exp}$/M 1013 in each stage, where Δ $t_{exp}$ is the desired exposure time for the given light conditions. Therefore, selecting a higher value of M 1013 leads to faster operation of the AE control and AWB operation. The user-provided parameter N 1022B determines the flicker suppression frequency by forcing the exposure time to be a multiple of N 1022B.

The exposure counter 1020B also runs in stage 2, yet it no longer counts the exposure time. Instead, at the beginning of stage 2 it starts from the exposure time reached in stage 1 and then counts backwards. When it reaches zero, it issues the signal stop_s2 1033. Thus the time Δ t from the start of stage 1 until stop_s1 1020 goes high is the same as the time from the start of stage 2 until stop_s2 1033 goes high. Because stop_s1 1020 and stop_s2 1033 are used as sampling signals, therefore, keeping the same Δ t ensures a fair comparison between the sampled signals in stage 1 and stage 2 for the purposes of white balancing.

Figure 1:
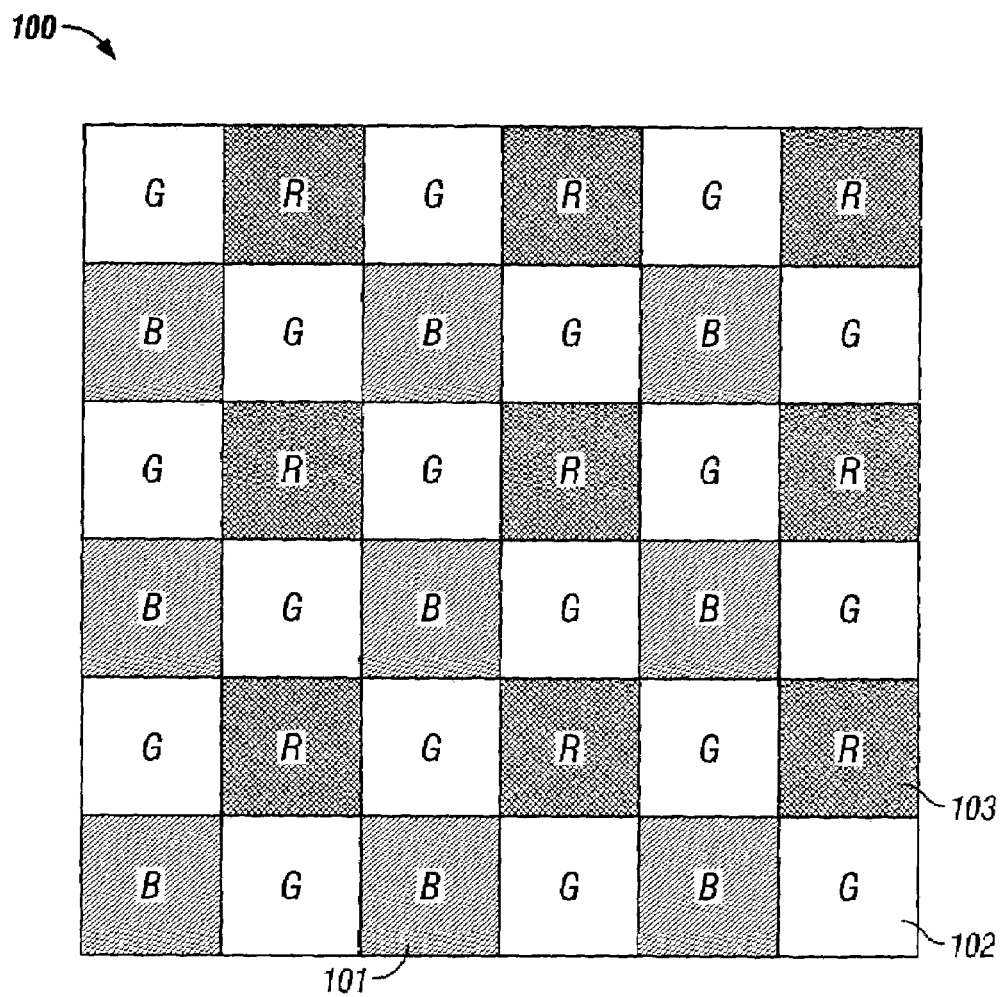
FIG. 1 shows a pixel arrangement in a Bayer GR color pattern used in one aspect of the present invention.
Figures 1, 10C:
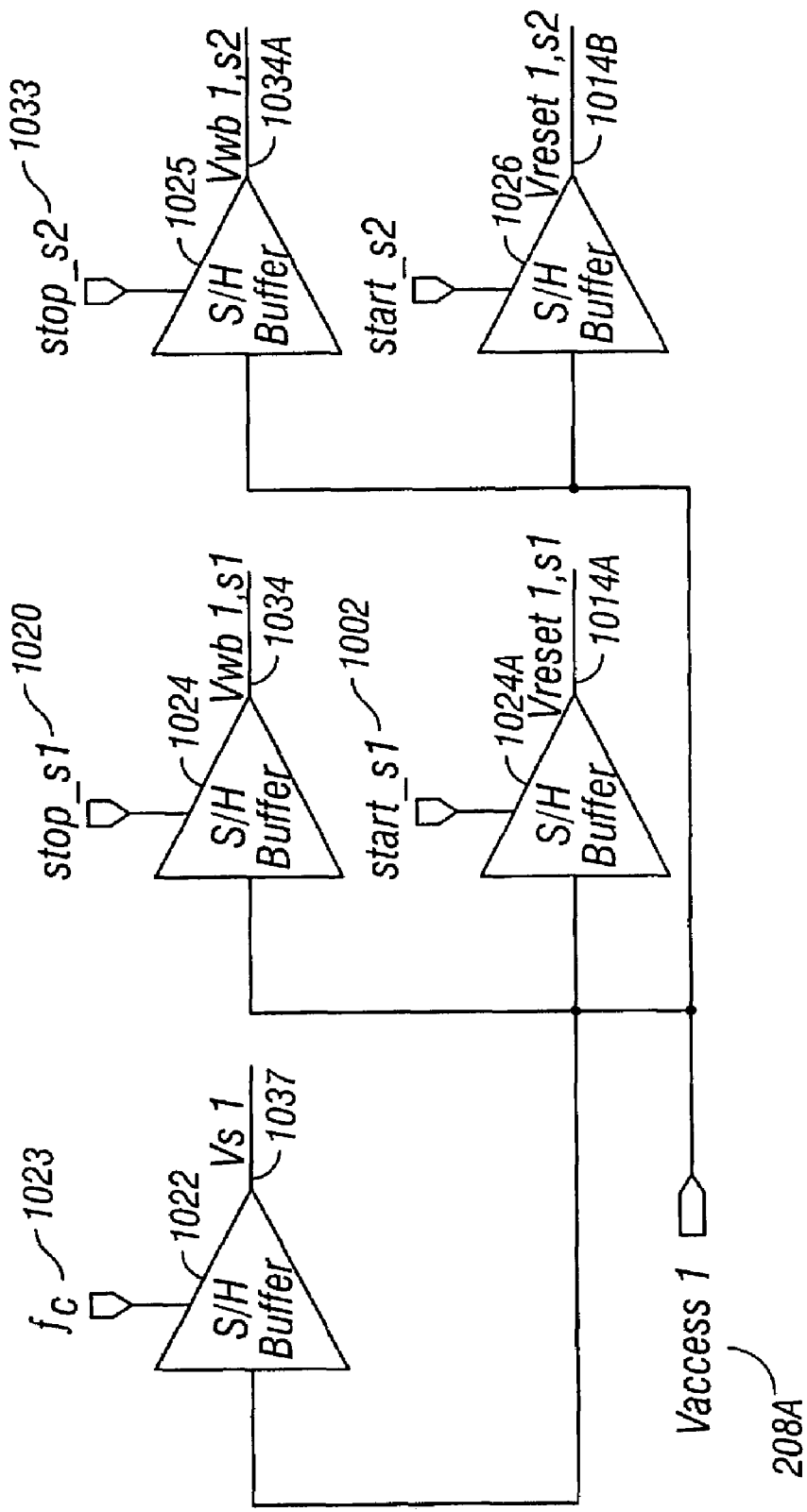
Figures 2, 10C:
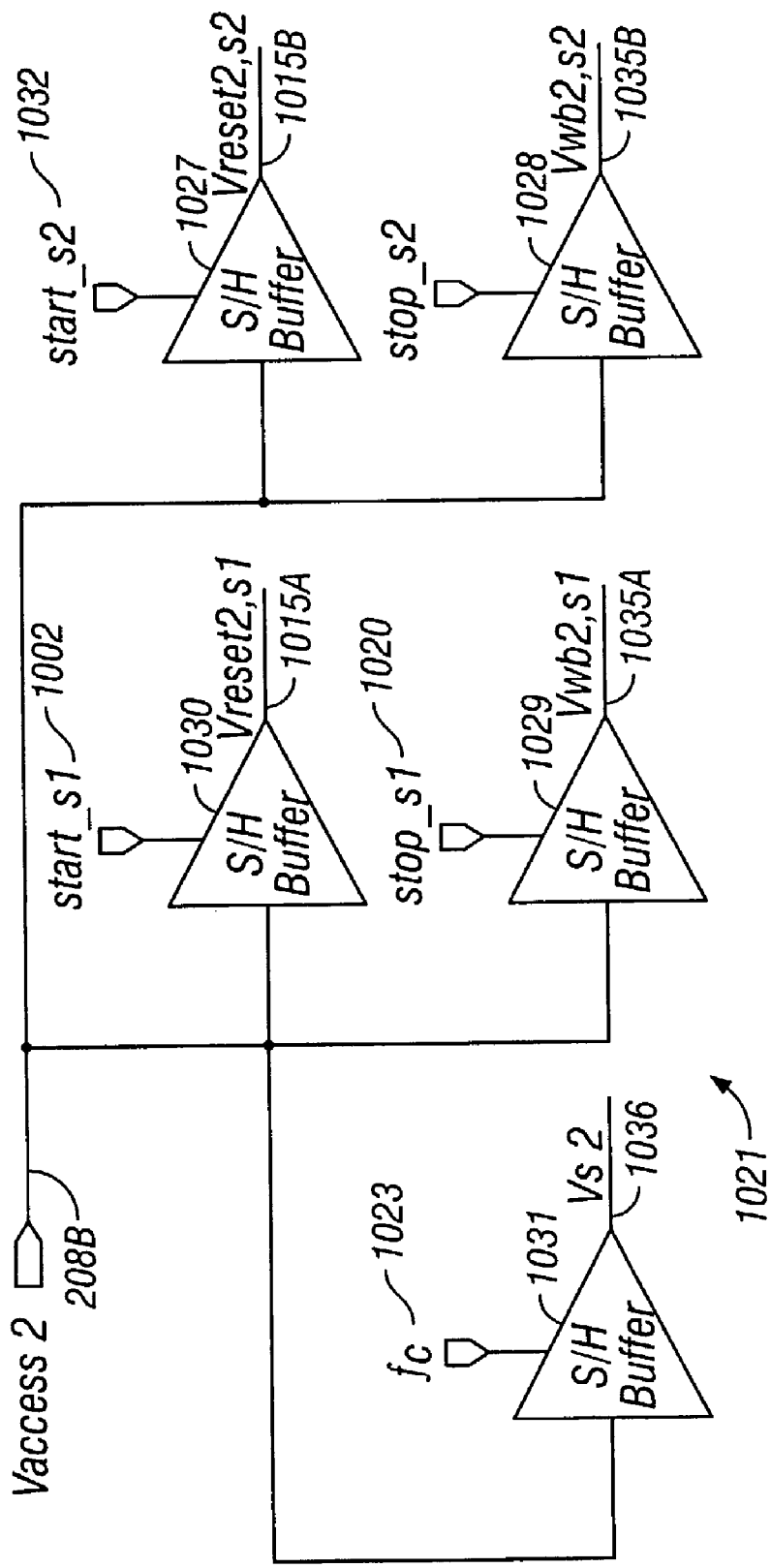

SH buffer array (FIGS. 10C-1 and 10C-2). Plural sample-and-hold (SH) buffers (for example, 1024, 1024A, 1025, 1026, 1027, 1028, 1029 and 1030) are used, in one aspect of the present invention as shown in FIGS. 10C-1 and 10C-2. In one aspect of the present invention, ten buffers may be used. Five buffers are used to sample $V_{access1}$ 208A and five more are used to sample $V_{access2}$ 208B, at different instances of time. Depending on when the voltage is sampled, the SH buffers can be categorized as follows:

Reset SH buffers: At the beginning of stage 1 (when start_s1 1002 goes high), $V_{access1}$ 208A and $V_{access2}$ 208B are sampled and the sampled voltages $V_{rest1,s1}$ 1014A and $V_{reset2,s1}$ 1015A are the corresponding reset voltages for the two channels. At the beginning of stage 2 (when start_s2 1032 goes high), the reset voltages $V_{reset1,s2}$ 1014B and $V_{reset2,s2}$ 1015B are sampled for two channels. Sampling the reset levels separately for each channel in each stage allows accurate prediction of gain and WB coefficients even in the presence of mismatches or variation in the reset levels from stage 1 to stage 2.

Crossover SH buffers: When $V_{access1}$ 208A or $V_{access2}$ 208B drops by Δ V 1011 and crosses the reference in stage 1 (stop_s1 1020 goes high), voltages $V_{wb1,s1}$ 1034 and $V_{wb2,s1}$ 1035A are sampled for channels 1 and 2, respectively. When the signal stop_s2 1033 goes high in stage 2, voltages $V_{wb1,s2}$ 1034A and $V_{wb2,s2}$ 1035B are sampled for channels 1 and 2, respectively. The four crossover voltages and the four reset voltages provide sufficient information to find the G1, R, B and G2 pixel responses.

Step SH Buffers: On every f step of exposure counter 1020B in stage 1, i.e. whenever the exposure counter 1020B is incremented, voltages $V_{access1}$ 208A and $V_{access2}$ 208B are sampled. The sampled voltage levels for channels 1 and 2 are called $V_{s1}$ 1037 and $V_{s2}$, 1036 respectively, and are used to calculate the compensation gain. This gain is applied to all pixels in the analog domain when the exposure control alone cannot produce the desired frame brightness. This is the case when MaxExp 1022 has been reached and the frame is still too dark, or when the optimum exposure lies between kN and (k+1)N, where k is an integer. The method for finding the compensation gain is discussed later.

The voltage sampled by each SH buffer should lie within the output range of the buffer. This is guaranteed for all Reset SH Buffers, where the sampled voltage may be a reset level. The voltages sampled by the Crossover SH Buffers and the Step SH Buffers in stage 1 are not lower than ΔV 1011 below the reset level and also lie in the output range of the buffers. For a typical spectral distribution of the incident light, the sampled signals in stage 2 are not more that X times stronger than the sampled signals in stage 1 (for example, X may be equal to 2.5), and thus the foregoing system and method for AE and AWB is immune to saturation effects for incident light with typical spectral distribution.

Figure 10D:
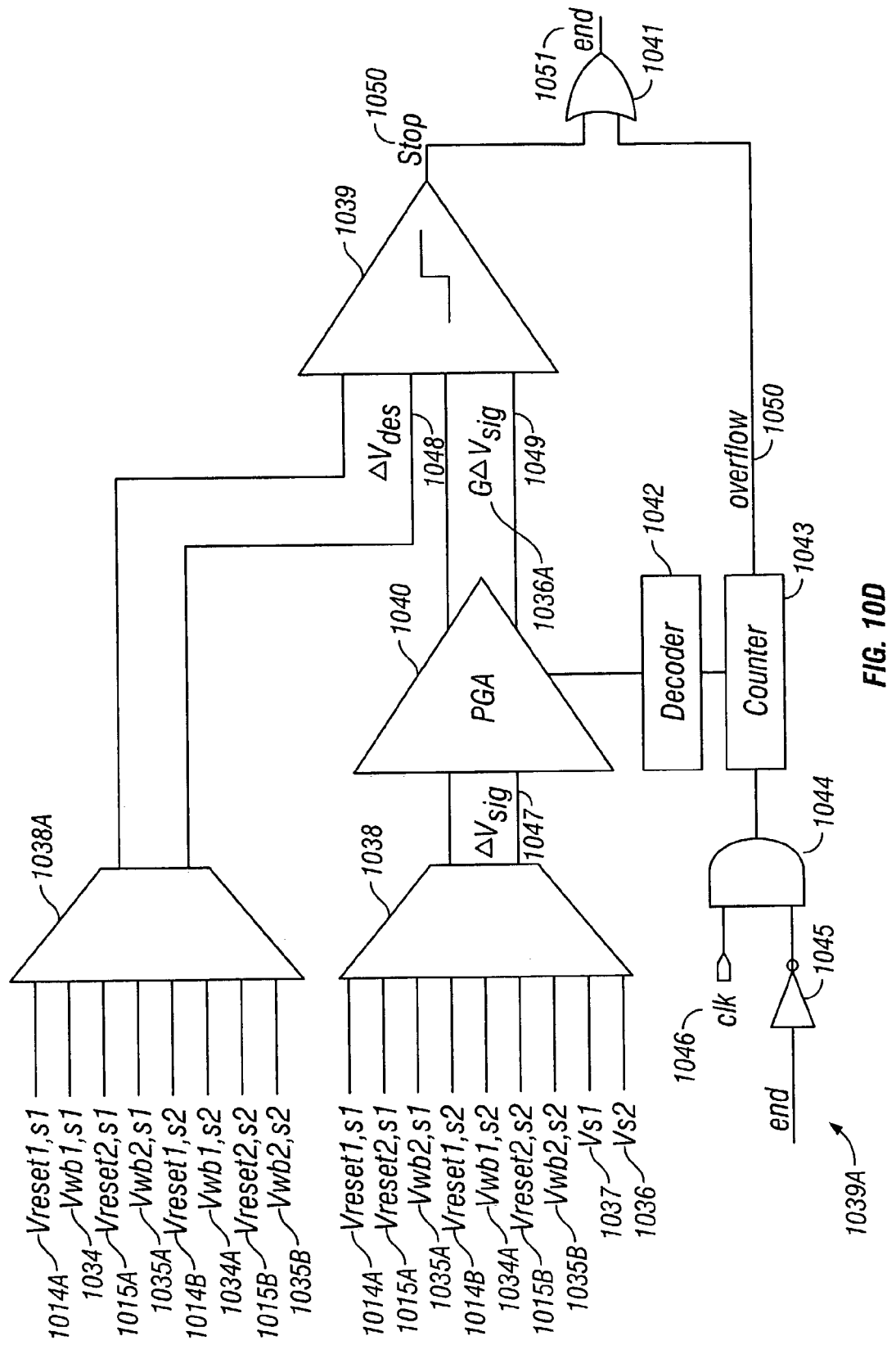

4) Gain Calculator (FIG. 10D). The purpose of the gain calculator is to find the minimum gain G 1036A for which $$G \Delta V_{sig} \geq \Delta V_{des}, \quad (12)$$

where $\Delta V_{sig}$ 1047 and $\Delta V_{des}$ 1048 are two differential signals. As gain G 1036A is increased monotonically in a stepwise fashion, equation (12) will first become true when G 1036A is approximately equal to $\Delta V_{sig}$ 1047/$\Delta V_{des}$ 1048. This provides the ratio of two analog signals for calculating the WB coefficients and the compensation gain setting.

To determine gain G 1036A, a clk signal 1046 provides the timing and synchronization for a counter 1043, a Programmable Gain Amplifier (PGA) 1040 and a comparator 1039. Counter 1043 is initially reset to 0 and is then incremented by 1 on every clk signal 1046 edge. Each value of the counter is transformed into a gain setting G 1036A by decoder 1042, which is then fed to PGA 1040.

PGA 1040 amplifies the input signal $\Delta V_{sig}$ 1047 by G 1036A. The output 1049 of PGA 1040 goes to one of the two inputs of a differential offset-canceling comparator 1039. The other input to comparator 1039 is the desired signal $\Delta V_{des}$ 1048. Comparator 1039 output stop signal 1050 goes high whenever equation (12) is satisfied. If stop signal 1050 is low and counter 1043 has not overflowed, then counter 1043 is incremented to the next setting, which increases gain G 1036A. At some instance either stop signal 1050 will be high or counter 1043 will overflow. As a result the end signal 1051 will go high, clk signal 1046 will be blocked and counter 1043 will no longer be incremented. The final setting of counter 1043 corresponds to the gain that is closest to $\Delta V_{sig}$ 1047/ $\Delta V_{des}$ 1048 and can be transferred to a WB register (not shown) or to a compensation gain register. The same or different instance of an identical PGA 1040 and decoder 1042 can be used to apply the necessary gain during frame readout.

The gain calculator is used once at the end of stage 1 to find the compensation gain, and twice at the end of stage 2 to find the two WB coefficients (the third WB coefficient is equal to 1 by definition). During every call, each of the two differential signals $\Delta V_{sig}$ 1047 and $\Delta V_{des}$ 1048 is physically connected through appropriate multiplexers (1038 and 1038A) to two single-ended SH buffer output voltages. After each call to the gain calculator the contents of the counter is transferred to the appropriate compensation gain or WB register.

In one aspect, the present invention overcomes the aforementioned problems associated with conventional AE control and AWB techniques. Pixel averaging in the present invention is implemented in the analog domain and it is designed such that the analog circuit does not process pixel data sequentially. Instead, the averaging operation is accomplished in one step by pixel charge sharing and this computation is performed in the imaging array itself. Due to the parallel nature of this computation the duration of the averaging process is independent of the number of pixels to be averaged and takes only a fraction of the time used by conventional techniques. Moreover, the obtained pixel average is always proportional to the average illumination; i.e., there is no saturation effect. As a result, both AE control and AWB can be completed in less than a frame, as opposed to several frames when the conventional techniques are used.

In another aspect of the present invention, since pixels are not read out sequentially, the entire readout and signal processing chain can be powered down during AE control and AWB operation. The present invention thus offers substantially decreased running time for performing AE control and AWB as well as significant reduction in the power dissipation.

In yet another aspect of the present invention, the pixel averages for each color are available as analog quantities to determine the WB coefficients given by equations (3a) and (3c), which saves chip area in the digital domain.

In yet another aspect of the present invention, no modification is required to the three-transistor active pixel sensor, commonly used in CMOS imagers. Only a single switch may be added between the access node and the reset voltage source, which is external to the imaging array.

Although the present invention has been described with reference to specific embodiments, these embodiments are illustrative only and not limiting. Many other applications and embodiments of the present invention will be apparent in light of this disclosure and the following claims.

What is claimed is:

1. An analog circuit for performing white balancing using a CMOS sensor, comprising:
   a first access node that provides a first access voltage to at least a first pixel of a pixel array;
   at least a second access node that provides a second access voltage to at least a second pixel of the pixel array;
   a first access switch that operationally couples the first access node to a reset voltage source for making the first access node to receive a reset voltage provided by the reset voltage source directly;
   a second access switch that operationally couples the second access node to the reset voltage source for making the second access node to receive the reset voltage directly;
   a first reset switch that controls the pixels in even rows of the pixel array; and
   a second reset switch that controls the pixels in odd rows of the pixel array, wherein during a measurement phase a change in one of the first access node voltage and the second access voltage provides an average response for a plurality of pixels coupled to the first access node and the second access node; and a pixel averaging operation is performed by pixel charge sharing in a single step instead of processing pixel data sequentially.

2. The analog circuit of claim 1, further comprising a first parasitic capacitor operationally coupled to the first access node.

3. The analog circuit of claim 1, further comprising a second parasitic capacitor operationally coupled to the second access node 4. The analog circuit of claim 1, wherein a signal external to the pixel array controls the first and the second access switches.

5. The analog circuit of claim 1, wherein a first reset signal controls the first reset switch and a second reset signal controls the second reset switch.

6. The analog circuit of claim 5, wherein during a reset phase if the first reset signal is high and the second reset signal is low then a pixel in an even row of the pixel array is coupled to one of the first access node and the second access node such that the first access voltage and the second access voltage is equal to the reset voltage.

7. The analog circuit of claim 5, wherein during the reset phase if the first reset signal is low and the second reset signal is high then a pixel in an odd row of the pixel array is coupled to one of the first access node and the second access node such that the first access voltage and the second access voltage is equal to the reset voltage.

8. An analog circuit for performing white balancing using a CMOS sensor, comprising:
   a first access node that provides a first access voltage to at least a first pixel of a pixel array;
   at least a second access node that provides a second access voltage to at least a second pixel of the pixel array;
   a first access switch that operationally couples the first access node to a reset voltage source for making the first access node to receive a reset voltage provided by the reset voltage source directly; and
   a second access switch that operationally couples the second access node to the reset voltage source for making the second access node to receive the reset voltage directly, wherein during a measurement phase a change in the first access node voltage or the second access voltage provides an average response for a plurality of pixels coupled to one of the first access node and the second access node; and a pixel averaging operation is performed by pixel charge sharing instead of processing pixel data sequentially.

9. The analog circuit of claim 8, further comprising:
a first reset switch that controls the pixels in even rows of the pixel array; and
second reset switch tat controls the pixels in odd rows of the pixel array.

10. The analog circuit of claim 9, wherein a first reset signal controls the first reset switch and a second reset signal controls the second reset switch.

11. The analog circuit of claim 10, wherein during a reset phase if the first reset signal is high and the second reset signal is low then a pixel in an even row of the pixel array is coupled to one of the first access node and the second access node such that the first access voltage and the second access voltage is similar to the reset voltage.

12. The analog circuit of claim 10, wherein during the reset phase if the first reset signal is low and the second reset signal is high then a pixel in an odd row of the pixel array is coupled to one of the first access node and the second access node such that the first access voltage and the second access voltage is similar to the reset voltage.

13. The analog circuit of claim 8, further comprising a first parasitic capacitor operationally coupled to the first access node.

14. The analog circuit of claim 8, further comprising a second parasitic capacitor operationally coupled to the second access node.

15. The analog circuit of claim 8, wherein a signal external to the pixel array controls the first access switch and the second access switch.

* * * * *